United States Patent
Choudhary et al.

(10) Patent No.: US 12,444,030 B2
(45) Date of Patent: Oct. 14, 2025

(54) METHOD AND ELECTRONIC DEVICE FOR OPTICAL CAMERA QUALITY ENHANCEMENT

(71) Applicant: SAMSUNG ELECTRONICS CO., LTD., Suwon-si (KR)

(72) Inventors: Choice Choudhary, Noida (IN); Sandeep Singh Spall, Noida (IN); Jayant Kumar Nagal, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 366 days.

(21) Appl. No.: 18/086,038

(22) Filed: Dec. 21, 2022

(65) Prior Publication Data

US 2023/0306565 A1    Sep. 28, 2023

Related U.S. Application Data

(63) Continuation of application No. PCT/KR2022/016477, filed on Oct. 26, 2022.

(30) Foreign Application Priority Data

Jan. 24, 2022    (IN) .............................. 202241003953

(51) Int. Cl.
*G06T 5/80*      (2024.01)
*G06T 5/20*      (2006.01)
(Continued)

(52) U.S. Cl.
CPC .................. *G06T 5/80* (2024.01); *G06T 5/20* (2013.01); *G06V 10/25* (2022.01); *G06V 10/761* (2022.01);
(Continued)

(58) Field of Classification Search
CPC .................... G01S 17/86; G01S 17/88; G06T 2207/10024; G06T 2207/20228;
(Continued)

(56) References Cited

U.S. PATENT DOCUMENTS

2013/0038701 A1    2/2013  Hung et al.
2015/0161773 A1*   6/2015  Takahashi .............. G06V 10/28
                                                            382/173

(Continued)

FOREIGN PATENT DOCUMENTS

CN    113487516 A     10/2021
EP    3 116 213 A1     1/2017
(Continued)

OTHER PUBLICATIONS

Communication dated Jan. 31, 2023, issued by the International Searching Authority in counterpart International Application No. PCT/KR2022/016477 (PCT/ISA/210).
(Continued)

*Primary Examiner* — Chineyere Wills-Burns
*Assistant Examiner* — Emmanuel Silva-Avina
(74) *Attorney, Agent, or Firm* — Sughrue Mion, PLLC

(57) ABSTRACT

A method for optical camera quality enhancement is provided. The method includes receiving, by an electronic device, an image frame of a scene including at least one object from a preview field of a camera of the electronic device, determining, by the electronic device, at least one region of the image frame affected by distortion, generating, by the electronic device, a pixel disparity map comprising a refraction coefficient associated with each pixel of the image frame based on the at least one region affected by the distortion, determining, by the electronic device, a plurality of regions on the pixel disparity map, each of the plurality of regions including pixels that have a similar pixel dispar- (Continued)

ity, estimating, by the electronic device, an optimal orientation of the electronic device to minimize the distortion in the image frame based on the plurality of regions on the pixel disparity map, and displaying, by the electronic device, an indication indicating the optimal orientation of the electronic device.

20 Claims, 20 Drawing Sheets

(51) Int. Cl.
G06V 10/25 (2022.01)
G06V 10/74 (2022.01)
H04N 1/40 (2006.01)
H04N 23/695 (2023.01)

(52) U.S. Cl.
CPC ....... *H04N 1/40012* (2013.01); *H04N 23/695* (2023.01); *G06T 2207/10024* (2013.01); *G06T 2207/20228* (2013.01); *G06T 2207/30244* (2013.01)

(58) Field of Classification Search
CPC ... G06T 2207/30244; G06T 5/20; G06T 5/80; G06V 10/25; G06V 10/761; H04N 13/221; H04N 2013/0081; H04N 23/633; H04N 23/64; H04N 23/695; H04N 23/81
USPC ........................................................ 382/275
See application file for complete search history.

(56) References Cited

U.S. PATENT DOCUMENTS

| | | | |
|---|---|---|---|
| 2015/0254813 | A1 | 9/2015 | Foi et al. |
| 2015/0332443 | A1* | 11/2015 | Yamada .................... H04N 5/21 |
| | | | 382/274 |
| 2016/0065856 | A1 | 3/2016 | Sohn et al. |
| 2018/0017847 | A1 | 1/2018 | Tamaru et al. |
| 2018/0324359 | A1* | 11/2018 | Pan ........................ H04N 23/80 |
| 2020/0098092 | A1 | 3/2020 | Fleizach et al. |
| 2021/0112230 | A1* | 4/2021 | Katz ..................... H04N 13/128 |
| 2021/0223446 | A1 | 7/2021 | Yamada et al. |

FOREIGN PATENT DOCUMENTS

| | | |
|---|---|---|
| JP | 2006-30619 A | 2/2006 |
| JP | 5362878 B2 | 12/2013 |
| JP | 2017-11537 A | 1/2017 |
| KR | 10-2007-0004202 A | 1/2007 |
| KR | 10-2020-0053838 A | 5/2020 |
| WO | WO-2022012034 A1 * | 1/2022 ............. G06N 3/045 |

OTHER PUBLICATIONS

Communication dated Jan. 31, 2023, issued by the International Searching Authority in counterpart International Application No. PCT/KR2022/016477 (PCT/ISA/237).

Communication issued on Sep. 24, 2024 by the Intellectual Property India for Indian Patent Application No. 202241003953.

Communication issued on Oct. 11, 2024 by the European Patent Office for European Patent Application No. 22922331.8.

* cited by examiner

913

| 1.000293 | 1.000289 | 1.000295 | 1.000297 |
|---|---|---|---|
| 1.000289 | 1.000009 | 1.000003 | 1.000007 |
| 1.000003 | 1.000007 | 1.000009 | 1.000001 |
| 1.000003 | 1.000007 | 1.000001 | 1.000009 |
| ~~1.333335~~ | ~~1.333338~~ | ~~1.333328~~ | ~~1.333331~~ |
| ~~1.333328~~ | ~~1.333338~~ | ~~1.333335~~ | ~~1.333332~~ |

914

| 1.000293 | 1.000289 | 1.000295 | 1.000297 |
|---|---|---|---|
| 1.000289 | 1.000009 | 1.000003 | 1.000007 |
| 1.000003 | 1.000007 | 1.000009 | 1.000001 |
| 1.000003 | 1.000007 | 1.000001 | 1.000009 |
| 1.333335 | 1.333338 | 1.333328 | 1.333331 |
| 1.333328 | 1.333338 | 1.333335 | 1.333332 |

915

| 1 | 1 | 2 | 2 |
|---|---|---|---|
| 1 | 1 | 4 | 4 |
| 3 | 3 | 4 | 4 |
| 3 | 3 | 4 | 4 |
| 5 | 5 | 5 | 5 |
| 5 | 5 | 5 | 5 |

916

Region 1 | Region 2
Region 3 | Region 4
Region 5

917

Region 1 | Region 2
Region 3 | Region 4
Region 5

918

| Region | Hash map |
|---|---|
| 1 | {0, 4, 4, 6, 1.1} |
| 2 | {4, 5, 8, 6, 1.17} |
| 3 | {0, 2, 4, 4, 1.24} |
| 4 | {4, 2, 5, 8, 1.33} |
| 5 | {0, 0, 8, 2, 1.03} |

FIG. 9D

METHOD AND ELECTRONIC DEVICE FOR OPTICAL CAMERA QUALITY ENHANCEMENT

CROSS-REFERENCE TO RELATED APPLICATION(S)

This application is a continuation application, claiming priority under § 365 (c), of an International application No. PCT/KR2022/016477, filed on Oct. 26, 2022, which is based on and claims the benefit of an Indian Patent Application number 202241003953, filed on Jan. 24, 2022, in the Indian Intellectual Property Office, the disclosure of which is incorporated by reference herein in its entirety.

TECHNICAL FIELD

The present disclosure relates to an electronic device, and more specifically to a method and an electronic device for optical camera quality enhancement.

BACKGROUND ART

Atmospheric refraction is quite common in everyday life. The presence of mediums in the atmosphere, such as hot air, fog, water droplets, and so on, causes the atmospheric refraction. The atmospheric refraction enables a light wave to bend while travelling through the mediums, where the bending of the light wave is caused due to differences in density of the mediums in the atmosphere. When a camera captures an image of the object under influence of the atmospheric refraction, a pixel shift or deformation of shape, size, and or position of the object occurs in the captured image, where the pixel shift and the deformation are distortions in the image.

DETAILED DESCRIPTION OF THE INVENTION

Technical Problem

FIG. 1 illustrates an example scenario of capturing an image of an object in which image distortion due to atmospheric refraction occurs. Consider, a user (20) is capturing an image of an animal (30) using a camera (10). Air (40) between the animal (30) and the camera (10) is hot compared to air around the animal (30) and the camera (10). Due to the temperature difference, the density of the air (40) and the air around the animal (30) and the camera (10) will also be different, which further results in the atmospheric refraction between the animal (30) and the camera (10). Thus, while capturing the image of the animal (30) using a camera (10) under the influence of the atmospheric refraction, the distortions will be present in the captured image (50) as shown in the FIG. 1. Hence, it is desired to provide a useful solution for improving image quality by minimizing the influence of atmospheric refraction in the image.

Technical Solution

Provided are a method and an electronic device for optical camera quality enhancement.

Additional aspects will be set forth in part in the description which follows and, in part, will be apparent from the description, or may be learned by practice of the presented embodiments.

In accordance with an aspect of the disclosure, there is provided a method. The method includes receiving, by an electronic device, an image frame of a scene including at least one object from a preview field of a camera of the electronic device, determining, by the electronic device, at least one region of the image frame affected by distortion, generating, by the electronic device, a pixel disparity map comprising a refraction coefficient associated with each pixel of the image frame based on the at least one region affected by the distortion, determining, by the electronic device, a plurality of regions on the pixel disparity map, each of the plurality of regions including pixels that have a similar pixel disparity, estimating, by the electronic device, an optimal orientation of the electronic device to minimize the distortion in the image frame based on the plurality of regions on the pixel disparity map, and displaying, by the electronic device, an indication indicating the optimal orientation of the electronic device.

In accordance with another aspect of the disclosure, there is provided an electronic device is provided. The electronic device comprises a display, a camera, and at least one processor. The At least one processor configured to receive an image frame of a scene including at least one object from a preview field of the camera, determine at least one region of the image frame affected by distortion, generate a pixel disparity map comprising a refraction coefficient associated with each pixel of the image frame based on the at least one region affected by the distortion, determine a plurality of regions on the pixel disparity map, each of the plurality of regions including pixels that have a similar pixel disparity, estimate an optimal orientation of the electronic device to minimize the distortion in the image frame based on the plurality of regions on the pixel disparity map, and display an indication indicating the optimal orientation of the electronic device through the display.

BRIEF DESCRIPTION OF DRAWINGS

The above and other aspects, features, and advantages of certain embodiments of the present disclosure will be more apparent from the following description taken in conjunction with the accompanying drawings, in which:

FIGS. 9A-9E are schematic diagrams illustrating an example scenario of enhancing the optical camera quality, according to according to an embodiment;

MODE FOR CARRYING OUT THE INVENTION

Figure 1:
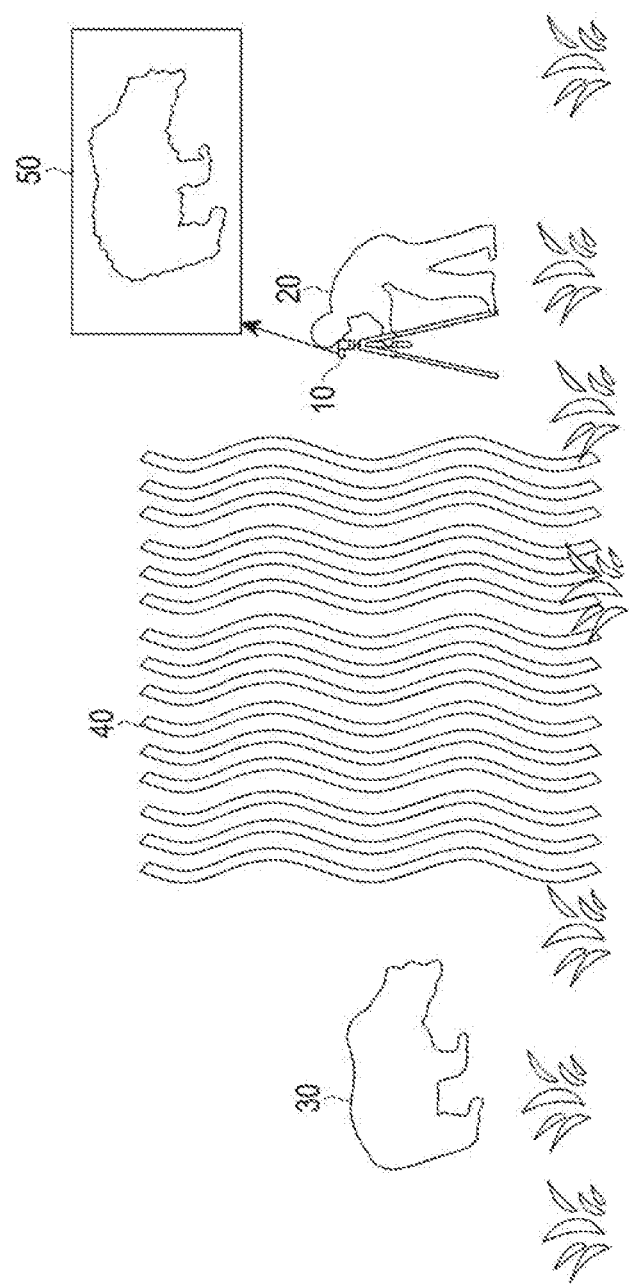
FIG. 1 illustrates an example scenario of capturing an image of an object in which image distortion due to atmospheric refraction occurs.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Provided are a method and an electronic device for optical camera quality enhancement.

It is an aspect to determine a refraction coefficient of a medium between an object and the electronic device that is caused by spatiotemporal variation, using an unintentional handshake while capturing the image. Multiple image frames may be captured and analyzed during a handshaking to discover pixel shifts in each image frame. Thus, the electronic device may determine a pixel disparity map of each frame based on the pixel shifts. Further, the electronic device may determine the refraction coefficient of the medium using pixel disparity map which represents the pixels that are displaced in 2 or more continuously captured frames.

It is another aspect to determine a spatiotemporal variation of the medium and therefore apply optical frame correction that minimizes an impact of the spatiotemporal variations. The optical frame correction may include noise removal among two rectangular regions of different disparity on the pixel disparity map for the optical enhancement, where less time is consumed for minimizing the impact of the spatiotemporal variations because the electronic device may process the two rectangular regions region-by-region.

It is yet another aspect to provide a set of possible measures to a user of the electronic device which can help to reduce an optical deformation due to the spatiotemporal variation which makes the electronic device to auto focus the object faster and capture the image of the object at faster capture rate without distortion.

In accordance with an aspect of the disclosure, a method is provided. The method includes receiving, by an electronic device, an image frame of a scene including at least one object from a preview field of a camera of the electronic device, determining, by the electronic device, at least one region of the image frame affected by distortion, generating, by the electronic device, a pixel disparity map comprising a refraction coefficient associated with each pixel of the image frame based on the at least one region affected by the distortion, determining, by the electronic device, a plurality of regions on the pixel disparity map, each of the plurality of regions including pixels that have a similar pixel disparity, estimating, by the electronic device, an optimal orientation of the electronic device to minimize the distortion in the image frame based on the plurality of regions on the pixel disparity map, and displaying, by the electronic device, an indication indicating the optimal orientation of the electronic device.

In an embodiment, where the method includes detecting, by the electronic device, a change in current orientation of the electronic device, where the change in the current orientation of the electronic device is dynamically displayed on a display of the electronic device, the method may include determining, by the electronic device, whether the change in the current orientation of the electronic device meets the optimal orientation of the electronic device. The method may include enabling, by the electronic device, the camera to capture an image frame of the scene upon determining that the change in the current orientation meets the optimal orientation.

In an embodiment, determining, by the electronic device, the region of the image frame affected by the distortion, may include determining, by the electronic device, the distortion caused by spatial-temporal refraction in the image frame based on a linear asymmetry in the image frame, a distance between the object and the electronic device, a temperature of a medium between the object and the electronic device, a type of the medium, and/or a color of the medium.

In an embodiment, determining, by the electronic device, the distortion in the image frame based on the linear asymmetry of the image frame, may include converting, by the electronic device, the image frame in Red Green Blue (RGB) format to a greyscale image frame, initializing, by the electronic device, an array of the image frame with complete zero values, selecting, by the electronic device, two 3*3 kernels from the array of the image frame for performing horizontal and vertical convolutions, determining, by the electronic device, gradient approximation value by convolving the two 3*3 kernels with the greyscale image frame, matching, by the electronic device, the gradient approximation value with a threshold gradient angle for identifying the linear asymmetry in the image frame, and detecting, by the electronic device, the distortion in the image frame upon identifying the linear asymmetry in the image frame.

In an embodiment, generating, by the electronic device, the pixel disparity map may include receiving, by the electronic device, an alternate image frame of the scene including the object from the camera of the electronic device positioned at an alternate geographical location, determining, by the electronic device, a displacement of each pixel in the alternate image frame with reference to a position of the corresponding pixel in the image frame based on the region affected by the distortion, determining, by the electronic device, a displacement of the electronic device for capturing the alternate image frame based on sensor values received from sensors of the electronic device, determining, by the electronic device, an effective displacement of each pixel in the alternate image frame by reducing the displacement of the electronic device from the displacement of each pixel in the alternate image frame, estimating, by the electronic device, the refraction coefficient associated with each pixel of the image frame based on the effective displacement of each pixel in the alternate image frame, and generating, by the electronic device, the pixel disparity map using the effective displacement of each pixel and the refraction coefficient associated with each pixel of the image frame.

In an embodiment, determining, by the electronic device, the plurality of regions on the pixel disparity map, may include determining, by the electronic device, a difference of the refraction coefficient between neighboring pixels of the image frame, identifying, by the electronic device, multiple sets of neighboring pixels, where the difference of the refraction coefficient between neighboring pixels of each set meets a threshold refraction coefficient, and generating, by the electronic device, the plurality of regions on the pixel disparity map based on the identified multiple sets of neighboring pixels.

In an embodiment, estimating, by the electronic device, the optimal orientation of the electronic device for minimizing the distortion in the image frame based on the plurality of regions on the pixel disparity map, may include estimating, by the electronic device, a change in a current orientation of the electronic device includes an angle of rotation of the electronic device and a linear movement of the electronic device towards or away from the object, for minimizing the distortion in the image frame based on the plurality of regions on the pixel disparity map.

In an embodiment, estimating, by the electronic device, the angle of rotation of the electronic device needed for minimizing the distortion in the image frame based on the plurality of regions on the pixel disparity map, may include determining, by the electronic device, coordinates of centers of a first region and a second region of the plurality of regions with reference to left bottom corner of the plurality pixel disparity map as an origin, modifying, by the electronic device, the coordinates of the center of the first region based on the refraction coefficient associated with the first region, and the coordinates of the center of the second region based on the refraction coefficient associated with the second region, determining, by the electronic device, vectors using the modified center coordinates of the first region and the second region with reference to the origin, and estimating, by the electronic device, an angle between the vectors as the angle of rotation of the electronic device needed for minimizing the distortion in the image frame.

In an embodiment, estimating, by the electronic device, the linear movement of the electronic device towards or away from the object for minimizing the distortion in the image frame based on the plurality of regions on the pixel disparity map, may include determining, by the electronic device, a distance between the object and the electronic device using a Time-of-Flight (ToF) sensor of the electronic device, estimating, by the electronic device, an updated distance by determining a ratio of the distance and a refraction coefficient of a medium between the object and the electronic device, and determining, by the electronic device, the linear movement based on a difference between the distance and the updated distance needed for minimizing the distortion in the image frame.

In accordance with an aspect of the disclosure, an electronic device is provided. The electronic device comprises a display, a camera, and at least one processor. At least one processor configured to receive an image frame of a scene including at least one object from a preview field of the camera. At least one processor configured to determine at least one region of the image frame affected by distortion. At least one processor configured to generate a pixel disparity map comprising a refraction coefficient associated with each pixel of the image frame based on the at least one region affected by the distortion. At least one processor configured to determine a plurality of regions on the pixel disparity map, each of the plurality of regions including pixels that have a similar pixel disparity. At least one processor configured to estimate an optimal orientation of the electronic device to minimize the distortion in the image frame based on the plurality of regions on the pixel disparity map. At least one processor configured to display an indication indicating the optimal orientation of the electronic device through the display.

The least one processor is further configured to detect a change in a current orientation of the electronic device, the change in the current orientation of the electronic device being dynamically displayed on the display. The least one processor is further configured to determine whether the change in the current orientation of the electronic device matches the optimal orientation of the electronic device. The least one processor is further configured to capture, through the camera, at least one image frame of the scene when the change in the current orientation matches the optimal orientation.

The least one processor is configured to determine the distortion caused by spatial-temporal refraction in the image frame based on at least one of a linear asymmetry in the image frame, a distance between the at least one object and the electronic device, a temperature of a medium between the at least one object and the electronic device, a type of the medium, or a color of the medium.

The least one processor is configured to convert the image frame from Red Green Blue (RGB) to a greyscale image frame, initialize an array of the image frame with complete zero values, select two 3*3 kernels from the array of the image frame for performing horizontal and vertical convolutions, determine a gradient approximation value by convolving the two 3*3 kernels with the greyscale image frame, compare the gradient approximation value with a threshold gradient angle for identifying the linear asymmetry in the image frame, and detect the distortion in the image frame based on a result of the comparing.

The least one processor is configured to receive an alternate image frame of the scene including the at least one object from the camera of the electronic device positioned at an alternate geographical location, determine a displacement of each pixel in the alternate image frame with reference to a position of a corresponding pixel in the image frame based on the at least one region affected by the distortion, determine a displacement of the electronic device for capturing the alternate image frame based on values received from orientation sensors of the electronic device, determine, from the displacement of each pixel in the alternate image frame, an effective displacement of each pixel in the alternate image frame by reducing the displacement of the electronic device, estimate the refraction coefficient associated with each pixel of the image frame based on the effective displacement of each pixel in the alternate image frame, and generate the pixel disparity map using the effective displacement of each pixel and the refraction coefficient associated with each pixel of the image frame.

The least one processor is configured to determine a difference of the refraction coefficient between neighboring pixels of the image frame, identify multiple sets of neighboring pixels, where, for each set of the multiple sets, the difference of the refraction coefficient between neighboring pixels in the set is greater than or equal to a threshold refraction coefficient, and generate the plurality of regions on the pixel disparity map based on the multiple sets of neighboring pixels.

The least one processor is configured to estimate a change in a current orientation of the electronic device, the change comprising at least one of an angle of rotation of the electronic device or a linear movement of the electronic device towards or away from the at least one object.

Wherein the change comprises the angle of rotation. The least one processor is configured to determine coordinates of centers of a first region and a second region of the plurality of regions with reference to a left bottom corner of the pixel disparity map as an origin, modify the coordinates of a center of the first region based on the refraction coefficient associated with the first region, and modify the coordinates of a center of the second region based on the refraction coefficient associated with the second region, determine vectors using the modified center coordinates of the first region and the second region with reference to the origin, and estimate an angle between the vectors as the angle of rotation of the electronic device.

Wherein the change comprises the linear movement. The least one processor is configured to determine a distance between the at least one object and the electronic device using a Time-of-Flight (ToF) sensor of the electronic device, estimate an updated distance by determining a ratio of the distance and a refraction coefficient of a medium between the at least one object and the electronic device, and determine the linear movement based on a difference between the distance and the updated distance.

Unlike related art methods and systems, the electronic device according to various embodiments detects user context, situations upon detecting a loss of information or degradation of user experience caused by optical deformation of the image frame of the object based on various factors such as density difference of a medium between the object and the electronic device, a height/distance difference between the object and the electronic device, a spatiotemporal variation (i.e. the refraction coefficient), etc. Further, the electronic device according to various embodiments determines the pixel disparity caused by the spatiotemporal variation and therefore plotting the pixel disparity map. Further, the electronic device according to various embodiments creates rectangular regions of different disparity on the pixel disparity map, in which each region has similar pixel disparity. Further, the electronic device according to various embodiments recommends a set of possible measures to the user to follow which help to reduce the optical deformation which makes faster auto focus and faster capture rate.

Unlike related art methods and systems, the electronic device according to various embodiments determines the spatiotemporal variation of the medium and therefore applies optical frame correction that minimizes an impact of the spatiotemporal variations. The optical frame correction may include noise removal among two rectangular regions of different disparity for the optical enhancement, where less time is consumed for minimizing the impact of the spatiotemporal variations as the electronic device processes region-by-region.

Referring now to the drawings, and more particularly to FIGS. 2A through 12, there are shown various embodiments.

Figure 2A:
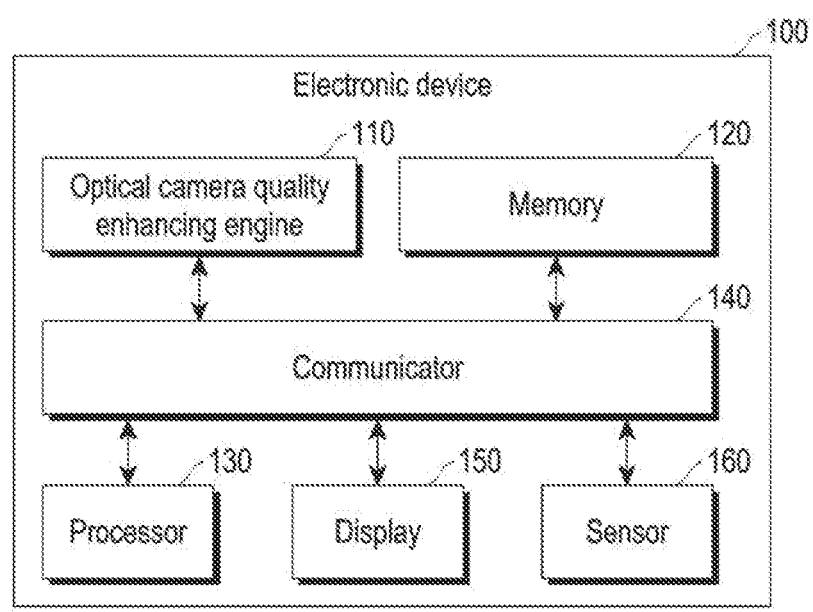
FIG. 2A is a block diagram of an electronic device for optical camera quality enhancement, according to an embodiment.

FIG. 2A is a block diagram of an electronic device (100) for optical camera quality enhancement, according to an embodiment. Examples of the electronic device (100) include, but are not limited to, a smartphone, a tablet computer, a Personal Digital Assistance (PDA), a desktop computer, an Internet of Things (IoT), a wearable device, an image capturing device, etc. In an embodiment, the electronic device (100) may include an Optical Camera Quality Enhancing Engine (OCQEE) (110), a memory (120), a processor (130), a communicator (140), a display (150), and a sensor (160).

The display (150) is a physical hardware component that may be used to display information to a user. Examples of the display (150) include, but are not limited to, a light emitting diode display, a liquid crystal display, a viewfinder, etc.

Figure 2B:
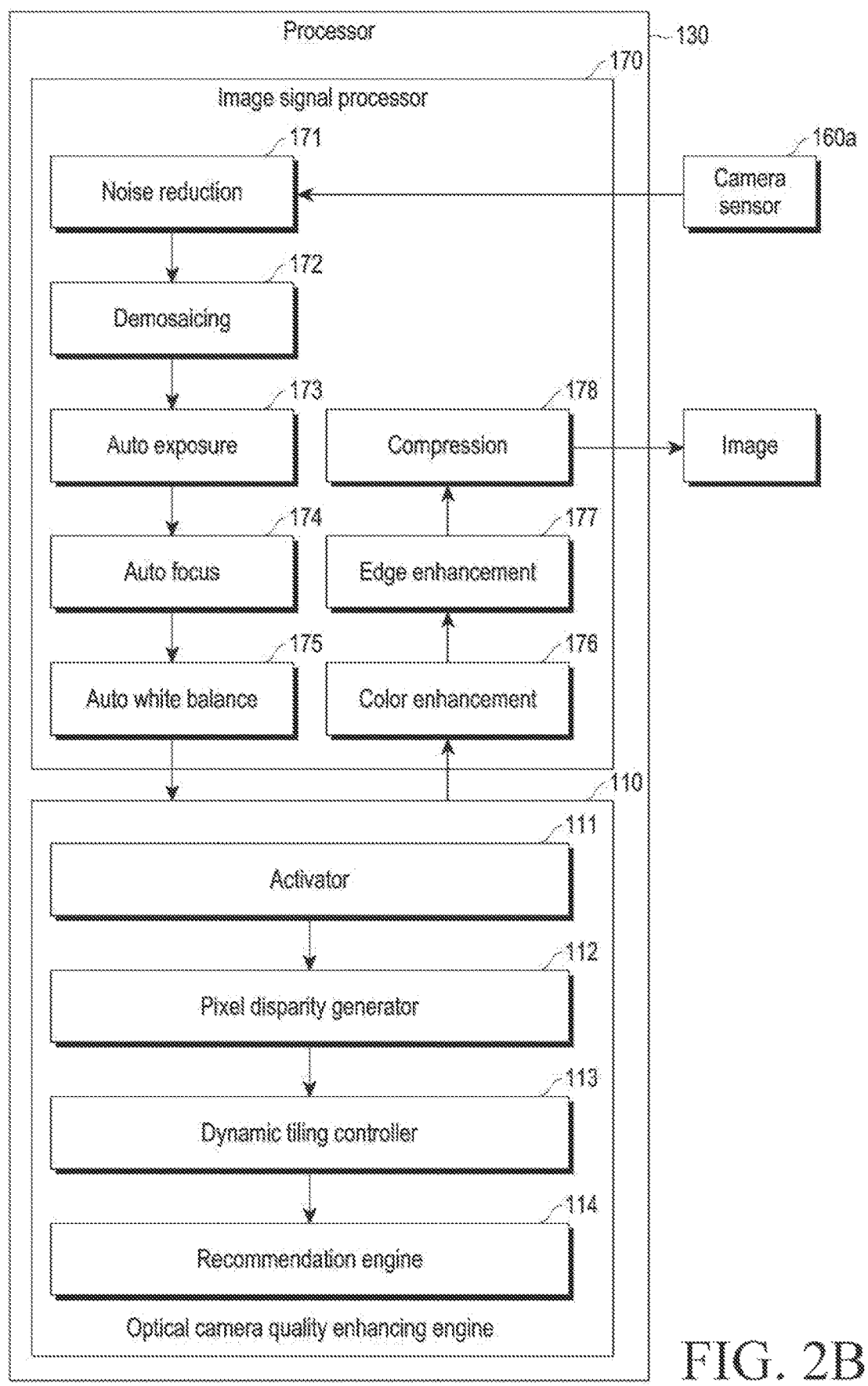
FIG. 2B is a block diagram of a processor, according to an embodiment.
Figure 9A:
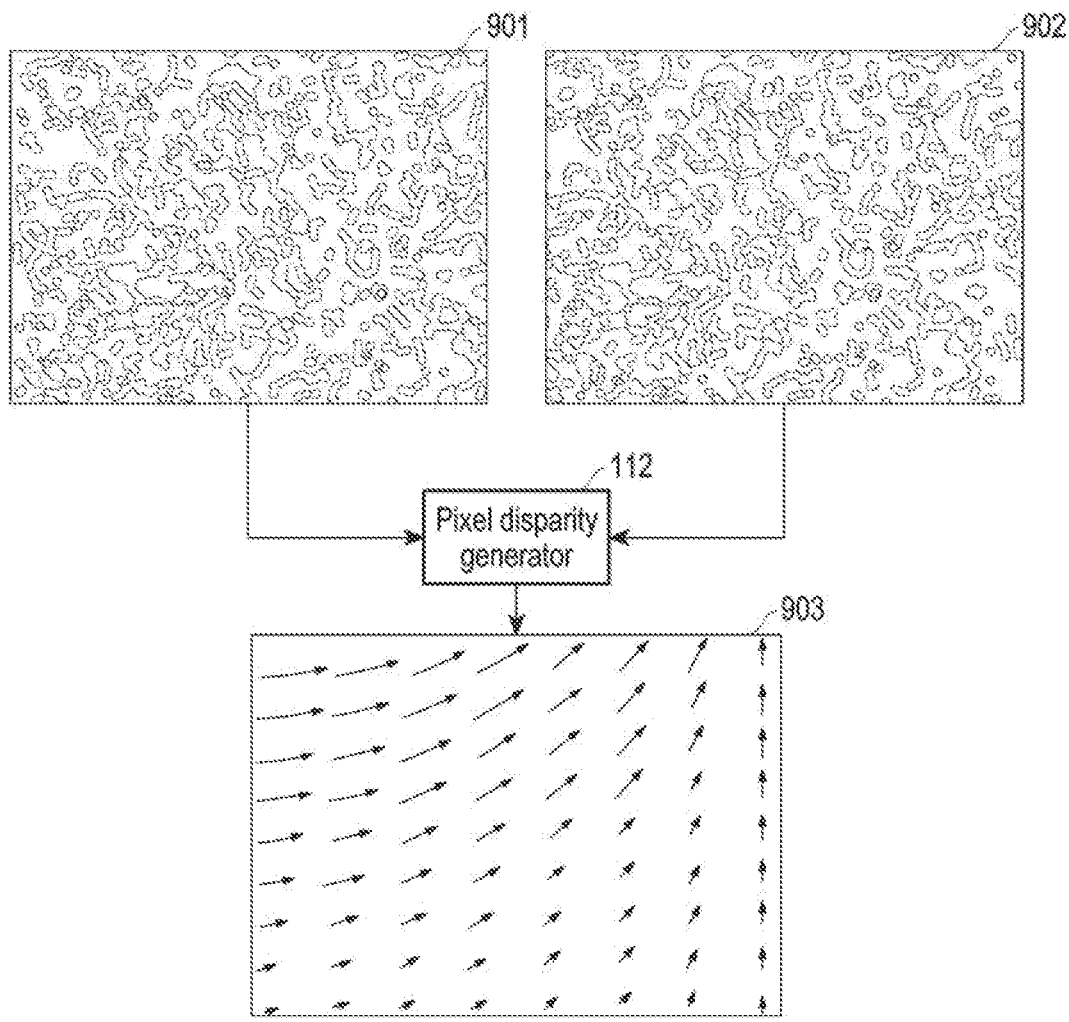
Figure 9B:
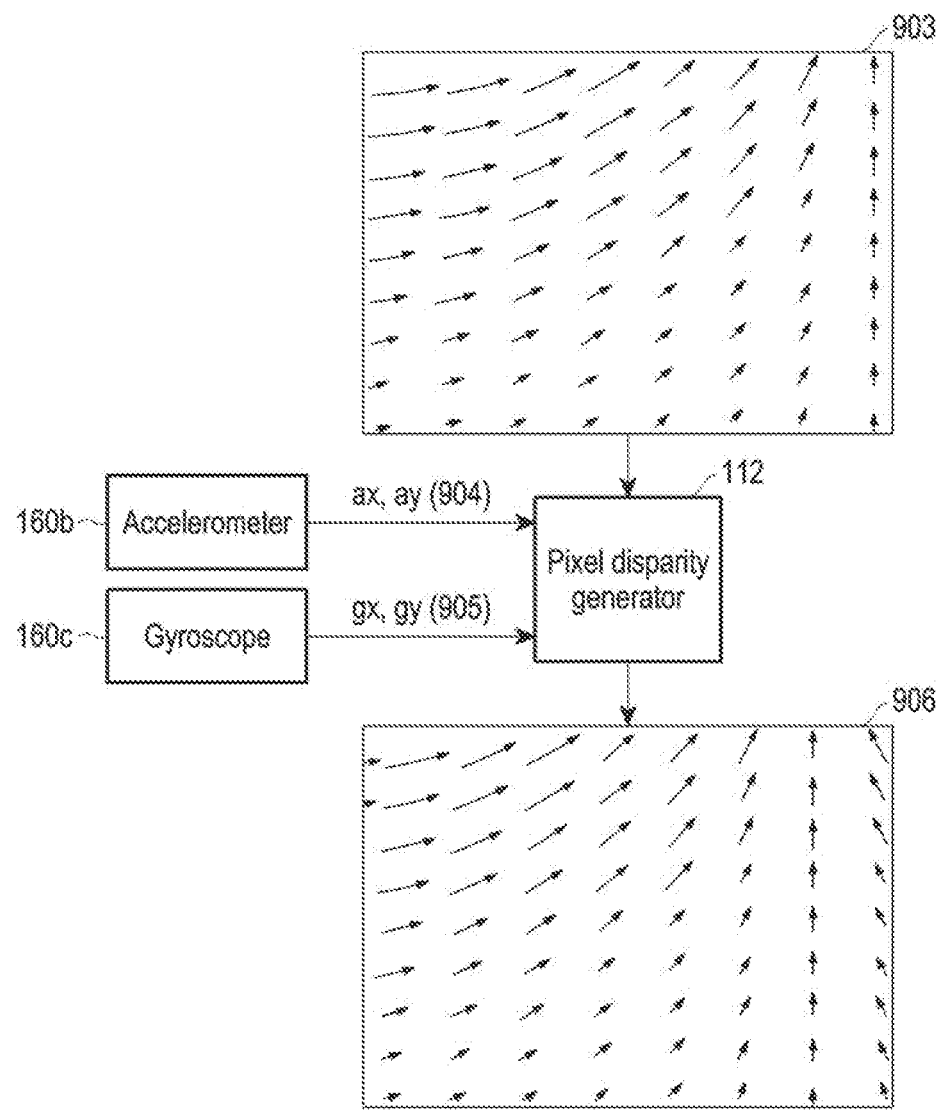
Figure 10A:
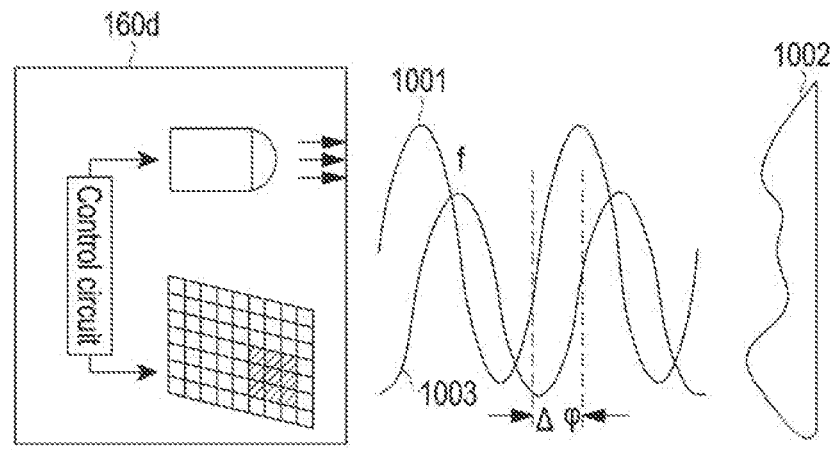
FIG. 10A is a schematic diagram illustrating an example scenario of determining a distance between the object and the electronic device by the electronic device, according to according to an embodiment.

Examples of the sensor (160) include, but are not limited to, a camera sensor (160a), orientations sensors (e.g. an accelerometer (160b), a gyroscope (160c)), and a Time-of-Flight (ToF) sensor (160d) (see FIGS. 2B, 9B and 10A). The OCQEE (110) is implemented by processing circuitry such as logic gates, integrated circuits, microprocessors, microcontrollers, memory circuits, passive electronic components, active electronic components, optical components, hardwired circuits, or the like, and may In an embodiment be driven by a firmware. The circuits may, for example, be embodied in one or more semiconductor chips, or on substrate supports such as printed circuit boards and the like.

The OCQEE (110) receives an image frame of a scene that includes an object from a preview field of the sensor (160), for example, the camera sensor (160*a*). Further, the OCQEE (110) determines a region of the image frame affected by distortion. In an embodiment, the OCQEE (110) determines the distortion caused by spatial-temporal refraction in the image frame based on a linear asymmetry in the image frame, a distance between the object and the electronic device (100), a temperature of a medium between the object and the electronic device (100), a type of the medium, and/or a color of the medium. In an embodiment, the OCQEE (110) traverses through classifiers arranged based on a rule stored in the memory (120) for determining the distortion caused by the spatial-temporal refraction in the image frame.

In an embodiment, for checking the linear asymmetry in the image frame, initially the OCQEE (110) converts the image frame in Red Green Blue (RGB) format to a greyscale image frame. Further, the OCQEE (110) initializes an array of the image frame with complete zero values. Further, the OCQEE (110) selects two 3*3 kernels from the array of the image frame for performing horizontal and vertical convolutions. Further, the OCQEE (110) determines a gradient approximation value by convolving the two 3*3 kernels with the greyscale image frame. Further, the OCQEE (110) matches the gradient approximation value with a threshold gradient angle (e.g.) 2° for identifying the linear asymmetry in the image frame. Further, the OCQEE (110) detects the distortion in the image frame upon identifying the linear asymmetry in the image frame.

The OCQEE (110) generates a pixel disparity map that includes a refraction coefficient associated with each pixel of the image frame based on the region affected by the distortion. In an embodiment, for generating the pixel disparity map, initially the OCQEE (110) receives an alternate image frame of the scene including the object from the sensor (160) (e.g., the camera sensor (160*a*)) of the electronic device (100) positioned at an alternate geographical location. In an example, the OCQEE (110) receives the alternate image frame of the scene during a handshake of the user on the electronic device (100) while capturing the image frame, where the electronic device (100) changes its position during the handshake. Further, the OCQEE (110) determines a displacement of each pixel in the alternate image frame with reference to a position of the corresponding pixel in the image frame based on the region affected by the distortion.

Further, the OCQEE (110) determines a displacement of the electronic device (100) for capturing the alternate image frame based on values received from the orientation sensors (e.g., the accelerometer 160*b* and the gyroscope 160*c*) of the electronic device (100). Further, the OCQEE (110) determines an effective displacement of each pixel in the alternate image frame by reducing the displacement of the electronic device (100) from the displacement of each pixel in the alternate image frame. Further, the OCQEE (110) estimates the refraction coefficient associated with each pixel of the image frame based on the effective displacement of each pixel in the alternate image frame. Further, the OCQEE (110) generates the pixel disparity map (also called as an effective pixel disparity map) using the effective displacement of each pixel and the refraction coefficient associated with each pixel of the image frame.

The OCQEE (110) determines a plurality of regions on the pixel disparity map, where pixels in each region of the plurality of regions have a similar pixel disparity. For example, In an embodiment, pixels in a first region may have a first similar pixel disparity and a second region may have a second similar pixel disparity that is different than the first similar pixel disparity. In other embodiments, pixels in all of the plurality of regions may have a similar pixel disparity. In an embodiment, for determining the plurality of regions on the pixel disparity map, initially the OCQEE (110) determines a difference of the refraction coefficient between neighboring pixels of the image frame. Further, the OCQEE (110) identifies multiple sets of neighboring pixels, where the difference of the refraction coefficient between neighboring pixels of each set meets a threshold refraction coefficient. For example, the threshold refraction coefficient may be 1, and the OCQEE (110) identifies multiple sets of neighboring pixels, where the difference of the refraction coefficient between neighboring pixels of each set is greater than or equal to 1. Further, the OCQEE (110) generates the plurality of regions on the pixel disparity map based on the identified multiple sets of neighboring pixels. Further, the OCQEE (110) determines coordinates of a left bottom corner and a right top corner of each region of the plurality of regions with reference to a left bottom corner of the pixel disparity map as an origin. Further, the OCQEE (110) stores the coordinates of the left bottom corner and the right top corner of each region of the plurality of regions and the refraction coefficient of that region as a hash map into the memory (120)

The OCQEE (110) estimates an optimal orientation of the electronic device (100) for minimizing the distortion in the image frame based on the plurality of regions on the pixel disparity map. In an embodiment, the optimal orientation includes information of an angle of rotation of the electronic device (100) and a linear movement of the electronic device (100) towards or away from the object, for minimizing the distortion in the image frame. In an embodiment, for estimating the optimal orientation, initially the OCQEE (110) determines a current orientation of the electronic device (100) using the orientation sensors (160*b*, 160*c*). Further, the OCQEE (110) estimates a change in the current orientation of the electronic device (100) where the change includes the angle of rotation of the electronic device (100) and the linear movement of the electronic device (100) towards or away from the object, for minimizing the distortion in the image frame based on the plurality of regions on the pixel disparity map.

In an embodiment, for estimating the angle of rotation of the electronic device (100) for minimizing the distortion in the image frame, initially the OCQEE (110) determines coordinates of centers of a first region and a second region of the plurality of regions with reference to the left bottom corner of the pixel disparity map as the origin. In an embodiment, the coordinates of the center of each region may be determined based on the coordinates of the left bottom corner and right top corner of the region in the hash map. Further, the OCQEE (110) modifies the coordinates of the center of the first region based on the refraction coefficient associated with the first region, and modifies the coordinates of the center of the second region based on the refraction coefficient associated with the second region. Further, the OCQEE (110) determines vectors using the modified center coordinates of the first region and the second region with reference to the origin. Further, the OCQEE (110) estimates the angle between the vectors as the angle of rotation of the electronic device (100) for minimizing the distortion in the image frame.

In an embodiment, for estimating the linear movement of the electronic device (100) towards or away from the object for minimizing the distortion in the image frame, initially the OCQEE (110) determines the distance between the object and the electronic device (100) using the ToF sensor (160d). Further, the OCQEE (110) estimates an updated distance by determining a ratio of the distance and a refraction coefficient of the medium between the object and the electronic device (100). Further, the OCQEE (110) determines an offset distance to linearly move the electronic device (100) towards or away from the object based on a difference between the distance and the updated distance.

The OCQEE (110) displays an indication indicating the optimal orientation of the electronic device (100). In an embodiment, the indication may include a recommendation about the optimal orientation. In an embodiment, the OCQEE (110) displays the indication on the display (150), where the indication includes information of the current orientation of the electronic device (100) and the optimal orientation for minimizing the distortion in the image frame.

The indication may inform the user about how to change the current orientation of the electronic device (100) to the optimal orientation. Upon detecting changing of the current orientation of the electronic device (100), the OCQEE (110) monitors the change in the current orientation of the electronic device (100), and checks whether the change in the current orientation of the electronic device (100) meets the optimal orientation of the electronic device (100), where the change in the current orientation of the electronic device (100) is dynamically displayed on the display (150). Further, the OCQEE (110) enables the camera sensor (160a) to capture the image frame of the scene upon determining that the change in the current orientation meets the optimal orientation. In other words, once the orientation of the electronic device (100) has changed to the optimal orientation, the OCQEE (110) enables the camera sensor (160a) to capture the image frame of the scene. The distortion will be significantly less or not present in the captured image frame, which improves the captured image and therefore the user experience.

The memory (120) stores the image frame, the hash map, and the rule for traversal of each classifier. The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) may be configured to store larger amounts of information than its storage space. In certain examples, a non-transitory storage medium may store data that may, over time, change (e.g., in Random Access Memory (RAM) or cache). The memory (120) may be an internal storage or the memory (12) may be an external storage of the electronic device (100) communicatively connected to electronic device (100), a cloud storage communicatively connected to electronic device (100), or any other type of external storage that is communicatively connected to electronic device (100).

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. Although the FIG. 2A shows that the processor (130) and the OCQEE (110) are separate (or independent) components, it is to be understood that embodiments are not limited thereto. In an embodiments, the OCQEE (110) can be included in the processor (130).

The communicator (140) is configured to communicate internally between hardware components in the electronic device (100). Further, the communicator (140) is configured to facilitate the communication between the electronic device (100) and other devices via one or more networks (e.g. Radio technology). The communicator (140) includes an electronic circuit specific to a standard that enables wired or wireless communication.

Although the FIG. 2A shows the hardware components of the electronic device (100), it is to be understood that embodiments are not limited thereto. In other embodiments, the electronic device (100) may include fewer or a greater number of hardware components. Further, the labels or names of the components are used only for illustrative purposes and do not limit the scope of the embodiments. One or more hardware components may be combined together to perform same or substantially similar function for the optical camera quality enhancement.

FIG. 2B is a block diagram of the processor (130), according to an embodiment. In an embodiment, the processor (130) includes an image signal processor (170) and the OCQEE (110). In an embodiment, the OCQEE (110) includes an activator (111), a pixel disparity generator (112), a dynamic tiling controller (113), and a recommendation engine (114). The activator (111), the pixel disparity generator (112), the dynamic tiling controller (113), and the recommendation engine (114) are implemented by processing circuitry such as logic gates, integrated circuits, microprocessors, microcontrollers, memory circuits, passive electronic components, active electronic components, optical components, hardwired circuits, or the like, and may In an embodiment be driven by a firmware. The circuits may, for example, be embodied in one or more semiconductor chips, or on substrate supports such as printed circuit boards and the like.

The activator (111) receives the image frame of the scene including the object from the preview field of the camera sensor (160a) after the image signal processing is performed by an image signal processor (170). The image signal processor (170) may be implemented by processing circuitry such as logic gates, integrated circuits, microprocessors, microcontrollers, memory circuits, passive electronic components, active electronic components, optical components, hardwired circuits, or the like, and In an embodiment may be driven by a firmware. The circuits may, for example, be embodied in one or more semiconductor chips, or on substrate supports such as printed circuit boards and the like. The image signal processing may include noise reduction (171), demosaicing (172), auto exposure (173), auto focus (174), and auto white balance (175) that are performed on the image frame. Further, the activator (111) determines the region of the image frame affected by distortion. In an embodiment, the activator (111) determines the distortion caused by spatial-temporal refraction in the image frame based on the linear asymmetry in the image frame, the distance between the object and the electronic device (100), the temperature of the medium between the object and the electronic device (100), the type of the medium, and/or the color of the medium. In an embodiment, the activator (111) traverses through the classifiers arranged based on the rule stored in the memory (120) for determining the distortion caused by spatial-temporal refraction in the image frame.

In an embodiment, for checking the linear asymmetry in the image frame, initially the activator (111) converts the image frame in the Red Green Blue (RGB) format to the greyscale image frame. Further, the activator (111) initializes the array of the image frame with complete zero values. Further, the activator (111) selects the two 3*3 kernels from the array of the image frame for performing the horizontal and vertical convolutions. Further, the activator (111) determines the gradient approximation value by convolving the two 3*3 kernels with the greyscale image frame. Further, the activator (111) matches the gradient approximation value with the threshold gradient angle (e.g.) 2° for identifying the linear asymmetry in the image frame. Further, the activator (111) detects the distortion in the image frame upon identifying the linear asymmetry in the image frame.

The pixel disparity generator (112) generates the pixel disparity map that includes the refraction coefficient associated with each pixel of the image frame based on the region affected by the distortion. In an embodiment, for generating the pixel disparity map, initially the pixel disparity generator (112) receives the alternate image frame of the scene including the object from the camera of the electronic device (100) positioned at the alternate geographical location. In an example, the pixel disparity generator (112) receives the alternate image frame of the scene during the handshake of the user while holding the electronic device (100) for capturing the image frame, where the electronic device (100) changes its position during the handshake. Further, the pixel disparity generator (112) determines the displacement of each pixel in the alternate image frame with reference to the position of the corresponding pixel in the image frame based on the region affected by the distortion.

Further, the pixel disparity generator (112) determines the displacement of the electronic device (100) for capturing the alternate image frame based on the values received from the orientation sensors (e.g., the accelerometer 160b and the gyroscope 160c) of the electronic device (100). Further, the pixel disparity generator (112) determines the effective displacement of each pixel in the alternate image frame by reducing the displacement of the electronic device (100) from the displacement of each pixel in the alternate image frame. Further, the pixel disparity generator (112) estimates the refraction coefficient associated with each pixel of the image frame based on the effective displacement of each pixel in the alternate image frame. Further, the pixel disparity generator (112) generates the pixel disparity map (also called as the effective pixel disparity map) using the effective displacement of each pixel and the refraction coefficient associated with each pixel of the image frame.

The dynamic tiling controller (113) determines the plurality of regions on the pixel disparity map, where pixels in each region of the plurality of regions have a similar pixel disparity. For example, In an embodiment, pixels in a first region may have a first similar pixel disparity and a second region may have a second similar pixel disparity that is different than the first similar pixel disparity. In other embodiments, pixels in all of the plurality of regions may have a similar pixel disparity. In an embodiment, for determining the plurality of regions on the pixel disparity map, initially the dynamic tiling controller (113) determines the difference of the refraction coefficient between neighboring pixels of the image frame. Further, the dynamic tiling controller (113) identifies the multiple sets of neighboring pixels, where the difference of the refraction coefficient between neighboring pixels of each set meets a threshold refraction coefficient (e.g. 1). For example, the threshold refraction coefficient may be 1, and the OCQEE (110) identifies multiple sets of neighboring pixels, where the difference of the refraction coefficient between neighboring pixels of each set is less than 1. Further, the dynamic tiling controller (113) generates the plurality of regions on the pixel disparity map based on the identified multiple sets of neighboring pixels. Further, the dynamic tiling controller (113) determines the coordinates of the left bottom corner and the right top corner of each region of the plurality of regions with reference to the left bottom corner of the pixel disparity map as the origin. Further, the dynamic tiling controller (113) stores the coordinates of the left bottom corner and the right top corner of each region of the plurality of regions and the refraction coefficient of that region as the hash map into the memory (120).

The recommendation engine (114) estimates the optimal orientation of the electronic device (100) for minimizing the distortion in the image frame based on the plurality of regions on the pixel disparity map. In an embodiment, for estimating the optimal orientation, initially the recommendation engine (114) determines the current orientation of the electronic device (100) using the orientation sensors (e.g. the accelerometer 160b and the gyroscope 160c). Further, the recommendation engine (114) estimates the change in the current orientation of the electronic device (100), where the change includes the angle of rotation of the electronic device (100) and the linear movement of the electronic device (100) towards or away from the object, for minimizing the distortion in the image frame based on the plurality of regions on the pixel disparity map.

In an embodiment, for estimating the angle of rotation of the electronic device (100) for minimizing the distortion in the image frame, initially the recommendation engine (114) determines the coordinates of the centers of the first region and the second region of the plurality of regions with reference to the left bottom corner of the pixel disparity map as the origin. Further, the recommendation engine (114) modifies the coordinates of the center of the first region based on the refraction coefficient associated with the first region, and modifies the coordinates of the center of the second region based on the refraction coefficient associated with the second region. Further, the recommendation engine (114) determines the vectors using the modified center coordinates of the first region and the second region with reference to the origin. Further, the recommendation engine (114) estimates the angle between the vectors as the angle of rotation of the electronic device (100) for minimizing the distortion in the image frame.

In an embodiment, for estimating the linear movement of the electronic device (100) towards or away from the object for minimizing the distortion in the image frame, initially the recommendation engine (114) determines the distance between the object and the electronic device (100) using the ToF sensor (160d). Further, the recommendation engine (114) estimates the updated distance by determining the ratio of the distance and the refraction coefficient of the medium between the object and the electronic device (100). Further, the recommendation engine (114) determines the offset distance to linearly move the electronic device (100) towards or away from the object based on the difference between the distance and the updated distance.

The recommendation engine (114) displays the indication indicating the optimal orientation of the electronic device (100). In an embodiment, the recommendation engine (114) displays the indication on the display (150), where the indication includes information of the current orientation of the electronic device (100) and the optimal orientation needed for minimizing the distortion in the image frame.

The indication may inform the user about how to change the current orientation of the electronic device (100) to the optimal orientation. Upon detecting changing of the current orientation of the electronic device (100), the recommendation engine (114) monitors the change in the current orientation of the electronic device (100), and checks whether the change in the current orientation of the electronic device (100) meets the optimal orientation of the electronic device (100), where the change in the current orientation of the electronic device (100) is dynamically displayed on the display (150). Further, the recommendation engine (114) enables the camera sensor (160a) to capture the image frame of the scene upon determining that the change in the current orientation meets the optimal orientation. In other words, once the orientation of the electronic device (100) has changed to the optimal orientation, the recommendation engine (114) enables the camera sensor (160a) to capture the image frame of the scene. The image signal processor (170) further performs image signal processing that includes color enhancement (176), edge enhancement (177), and compression (178) on the received image frame for capturing the image frame.

Although the FIG. 2B shows the hardware components of the OCQEE (110), it is to be understood that embodiments are not limited thereto. In other embodiments, the OCQEE (110) may include fewer or a greater number of hardware components. Further, the labels or names of the hardware components are used only for illustrative purposes and do not limit the scope of the embodiments. One or more hardware components may be combined together to perform same or substantially similar function for providing the recommendation for the optical camera quality enhancement.

Figure 3:
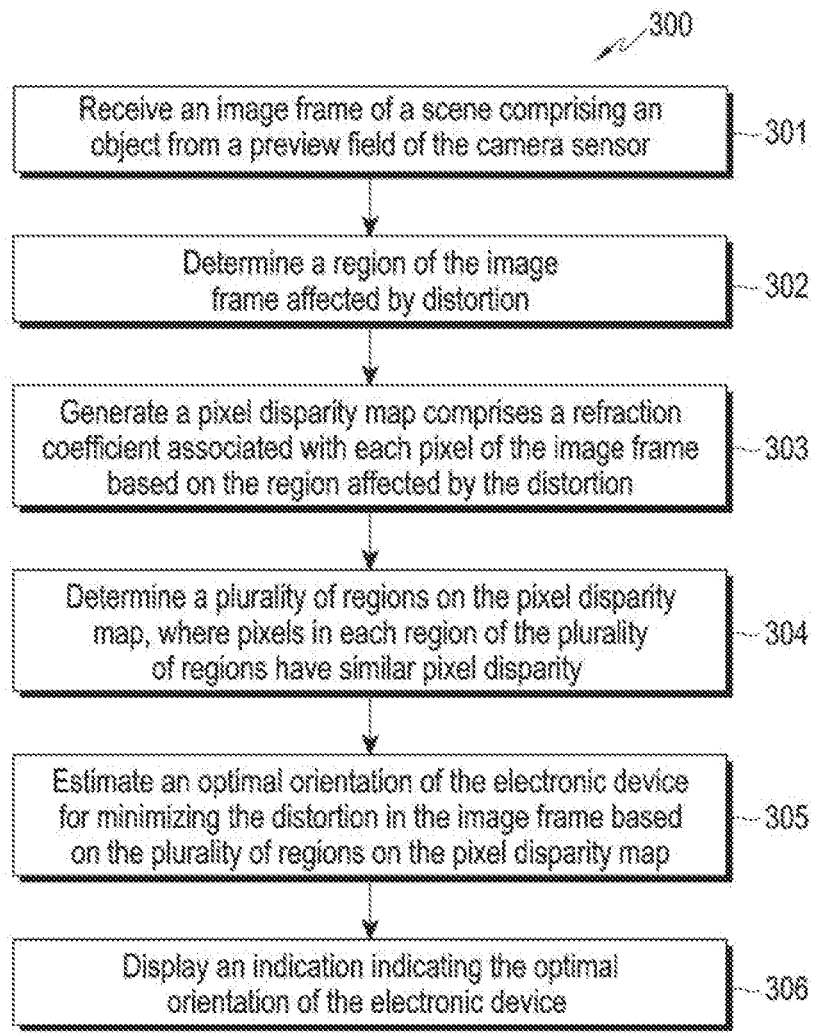
FIG. 3 is a flow diagram illustrating a method for enhancing an optical camera quality, according to an embodiment.

FIG. 3 is a flow diagram (300) illustrating a method for enhancing the optical camera quality by the electronic device (100) (e.g. the processor (130)), according to an embodiment. In an embodiment, the OCQEE (110) performs steps 301-306 of the flow diagram (300). At step 301, the method includes receiving the image frame of the scene including the object from the preview field of the camera sensor (160a). At step 302, the method includes determining the region of the image frame affected by distortion. At step 303, the method includes generating the pixel disparity map that includes the refraction coefficient associated with each pixel of the image frame based on the region affected by the distortion. At step 304, the method includes determining the plurality of regions on the pixel disparity map, where the pixels in each region of the plurality of regions have a similar pixel disparity. At step 305, the method includes estimating the optimal orientation of the electronic device (100) for minimizing the distortion in the image frame based on the plurality of regions on the pixel disparity map. At step 306, the method includes displaying the indication indicating the optimal orientation of the electronic device (100).

Figure 4:
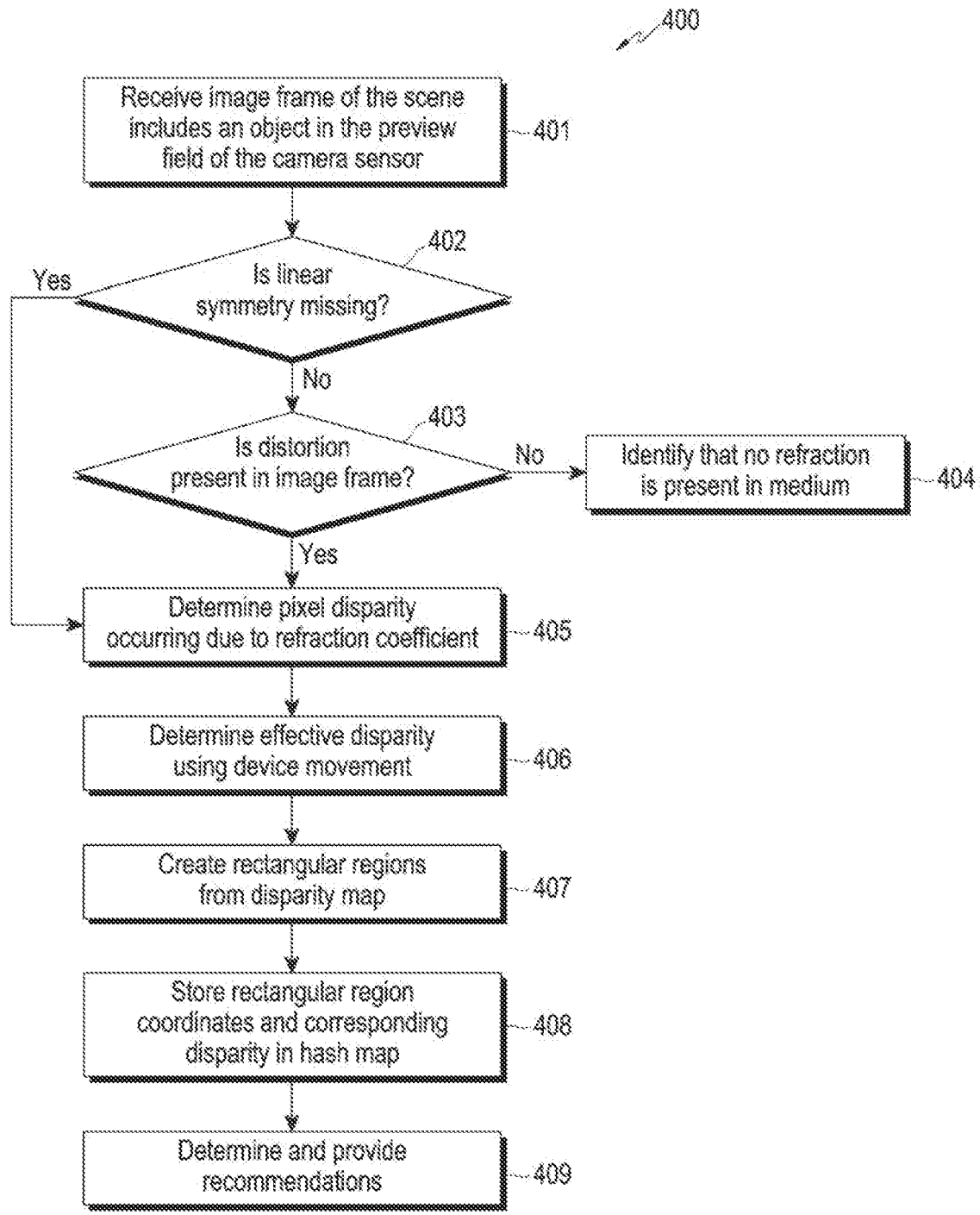
FIG. 4 is a flow diagram illustrating a method for providing a recommendation for the optical camera quality enhancement, according to an embodiment.

FIG. 4 is a flow diagram (400) illustrating a method for the optical camera quality enhancement, according to an embodiment. In an embodiment, the processor (130) (e.g. the OCQEE (110)) performs steps 401-408 of the flow diagram (400). At step 401, the method includes receiving the image frame of the scene that includes the object in the preview field of the camera sensor (160a). At steps 402-403, the method includes determining whether the distortion is present in the image frame due to the refraction as per the rule. For example, at step 402, the method includes determining whether the linear symmetry is missing in the image frame. If the linear symmetry is present in the image frame (Step 402, No), then at step 403, the method includes determining whether distortion is present in the image frame. For example, the method may determine whether the distance between the object and the camera sensor (160a) (i.e. electronic device (100)) is more than a threshold distance (e.g. 80 meters) and/or the temperature of the medium between the object and the camera sensor (160a) (i.e. electronic device (100)) are more than a threshold temperature (e.g. 30° Celsius). Upon determining that the distortion is not present in the image frame (Step 403, No), at step 404, the method includes identifying that the refraction is not present in the medium. Further, the OCQEE (110) does not display the indication to the user and the user may capture the image of the scene.

On the other hand, upon determining that the distortion is present in the image frame (Step 403, Yes), at step 405, the method includes determining the pixel disparity occurring due to the refraction coefficient. For example, the method may determine the pixel disparity occurring due to the refraction coefficient of the medium from shaking the electronic device (100). At step 406, the method includes determining an effective disparity using the movement of the electronic device (100) due to the shake. At step 407, the method includes creating the rectangular regions from the disparity map. At step 408, the method includes storing the rectangular region coordinates and the corresponding disparity in the hash map. At step 409, the method includes determining the recommendations using the details stored in the hash map and providing the recommendations for a change in orientation of the electronic device (100) for display.

Figure 5:
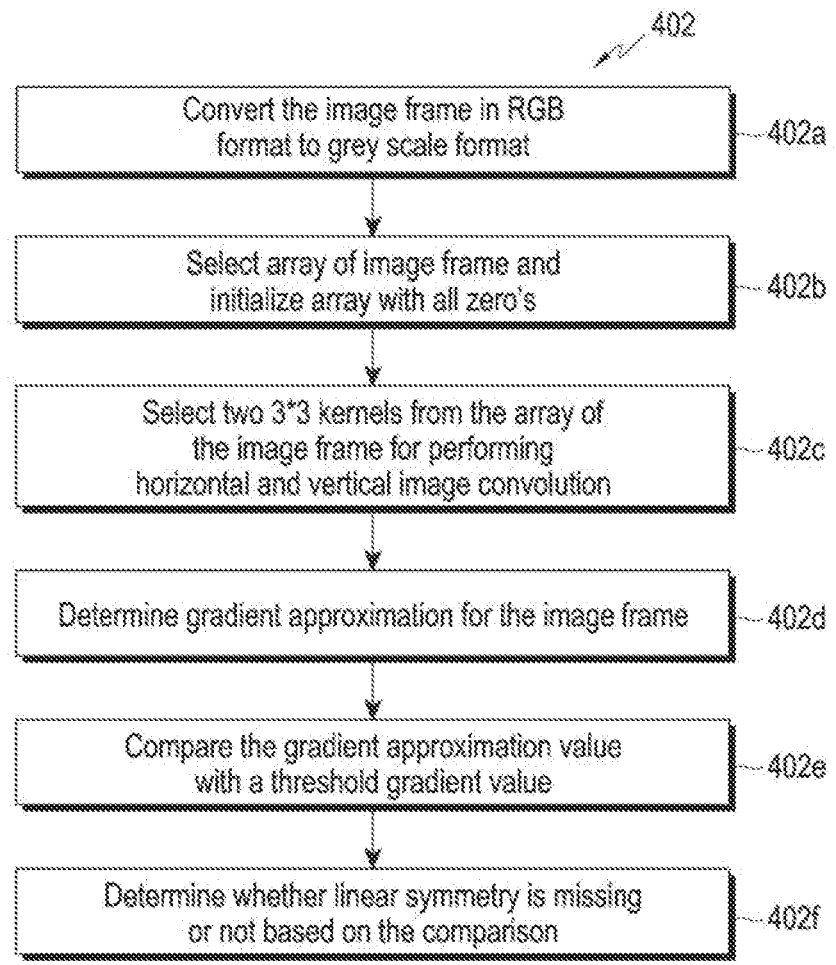
FIG. 5 is a flow diagram illustrating a method for checking linear symmetry in an image frame, according to an embodiment.

FIG. 5 is a flow diagram (402) illustrating a method for checking the linear symmetry in the image frame by the electronic device (100) (e.g. the processor (130)), according to an embodiment. The linear symmetry inside the image frame refers to a linear variation of pixel slope with respect to neighboring pixels. The linear symmetry of may be used to check for abnormal variation in the image frame that may result in the distortion. There are multiple reasons which may make the image frame looks asymmetrical. One of the multiple reasons may be refraction caused by various media through which light passes. In an embodiment, the activator (111) performs steps 402a-402f of the flow diagram (402). At step 402a, the method includes converting the image frame in the RGB format to a greyscale format. At step 402b, the method includes selecting the array of the image frame and initializing the array with all zeros. At step 402c, the method includes selecting two 3*3 kernels from the array of the image frame for performing the horizontal and vertical convolutions. Examples for two 3*3 kernels Gx and Gy are given below.

$$Gx = \begin{pmatrix} 1 & 0 & -1 \\ 1 & 0 & -1 \\ 1 & 0 & -1 \end{pmatrix}, Gy = \begin{pmatrix} -1 & -1 & -1 \\ 0 & 0 & 0 \\ 1 & 1 & 1 \end{pmatrix}$$

At step 402d, the method includes determining the gradient approximation value by convolving each 3*3 kernel with the greyscale image frame. At step 402e, the method includes comparing the gradient approximation value with the threshold gradient angle. At step 402f, the method includes determining the linear asymmetry in the image frame based on the comparison. Using the 2 kernels Gx and Gy, the activator (111) determines a gradient angle between 0° and 90°, considering the gradient angle as resultant vectors. For any asymmetrical point in the image frame, the gradient angle will change instantly and abnormally, and then remains consistent again for the object. The gradient angle which is consistent is the threshold gradient angle used for finding the asymmetry in the image frame.

Figure 6A:
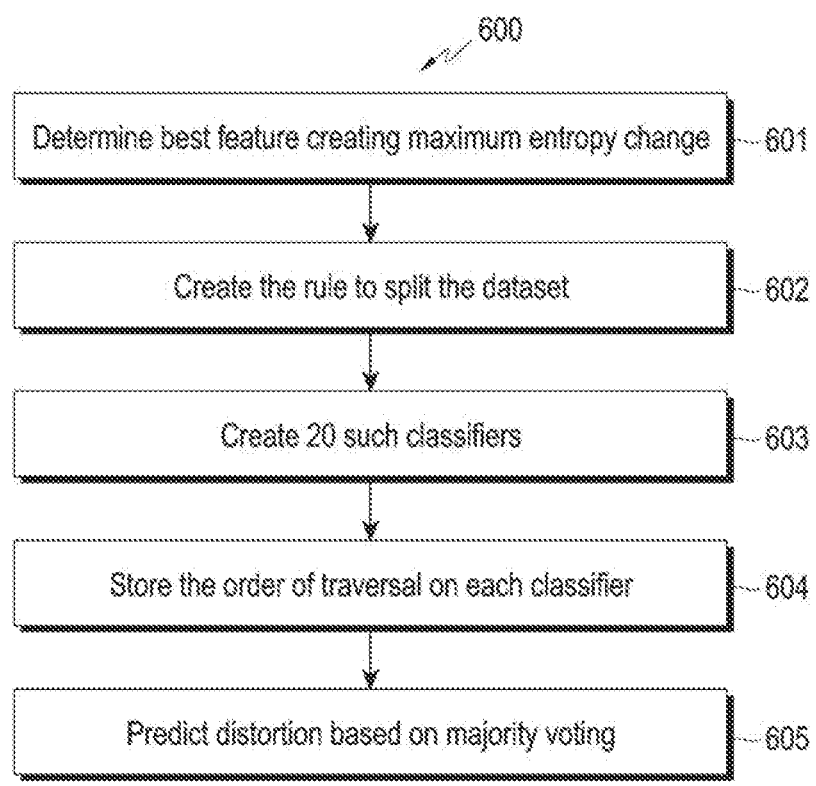
FIG. 6A is a flow diagram illustrating a method for determining distortion in the image frame, according to according to an embodiment.

FIG. 6A is a flow diagram (600) illustrating a method for determining the distortion in the image frame, according to an embodiment. In an embodiment, the processor (130) (e.g. the activator (111)) performs steps 601-605 of the flow diagram (600). At step 601, the method includes determining best feature that creates a maximum entropy change. An equation for determining the best feature is given below.

$$G_{ini} = 1 - \sum_{j=1}^{c} p_j^2$$

$$\text{Entropy} = -\sum_{j=1}^{c} p_j \log p_j$$

At step 602, the method includes creating the rule to split a dataset. Impurity of the dataset, Imp=$a^2+b^2$·where (a>#of 0s)(b>#of 1s). After calculating the impurity for every column and every possible value in respective column, the column with the maximum score is chosen as a splitting rule at a node. At step 603, the method includes creating 20 such classifiers. At step 604, the method includes storing an order of traversal on each classifier. At step 605, the method includes predicting the distortion in the image frame based on majority voting. The activator (111) uses a tree-based approach (e.g. random forest) for checking whether to invoke other hardware components for refraction correction, where a total of 20 rule-based classifiers are used to learn an in-house developed dataset with a depth of each tree as 6. The outputs of these 25 trees are then used to predict a correct output.

Figure 6B:
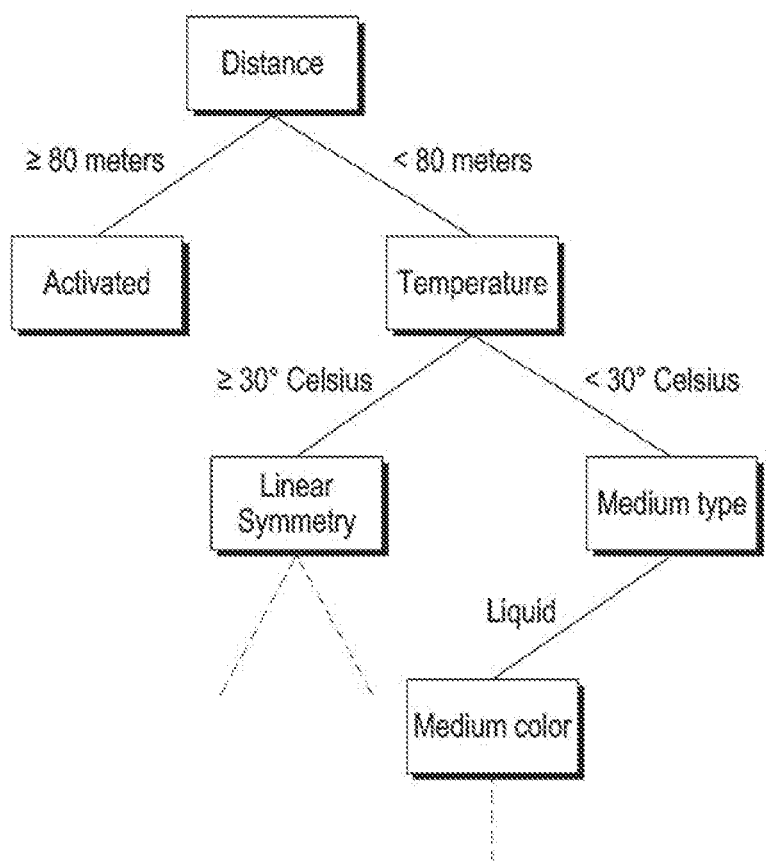
FIG. 6B illustrates a rule to activate an activator of the electronic device, according to according to an embodiment.

FIG. 6B illustrates the rule to activate the activator (111) of the electronic device (100) by the electronic device (100), according to an embodiment. As per an exemplary rule, if the distance between the electronic device (100) and the object is greater than or equal to 80 meters, then the activator (111) activates other hardware components for the refraction correction. If the distance between the electronic device (100) and the object is less than 80 meters, then the activator (111) checks for the temperature of the medium. If the temperature of the medium between the electronic device (100) and the object is greater than or equal to 30° Celsius, then the activator (111) checks for the linear symmetry in the image frame. If the temperature of the medium between the electronic device (100) and the object is less than 30° Celsius, then the activator (111) checks a type of the medium. If the medium is liquid, then the activator (111) checks the color of the medium. In FIG. 6B, the threshold distance of 80 meters and the threshold temperature of 30° Celsius are given by way of examples, and embodiments are not limited thereto. In other embodiments, the threshold distance may be greater than or less than 80 meters, and in other embodiments, the threshold temperature may be greater than or less than 30° Celsius.

Probability at leaf node: for 0=samples of '0'/total samples (ending at this leaf at training time), and for 1=samples of '1'/total samples (ending at this leaf at training time), where 1 means refraction mode activated and 0 means deactivated state.

Figure 7:
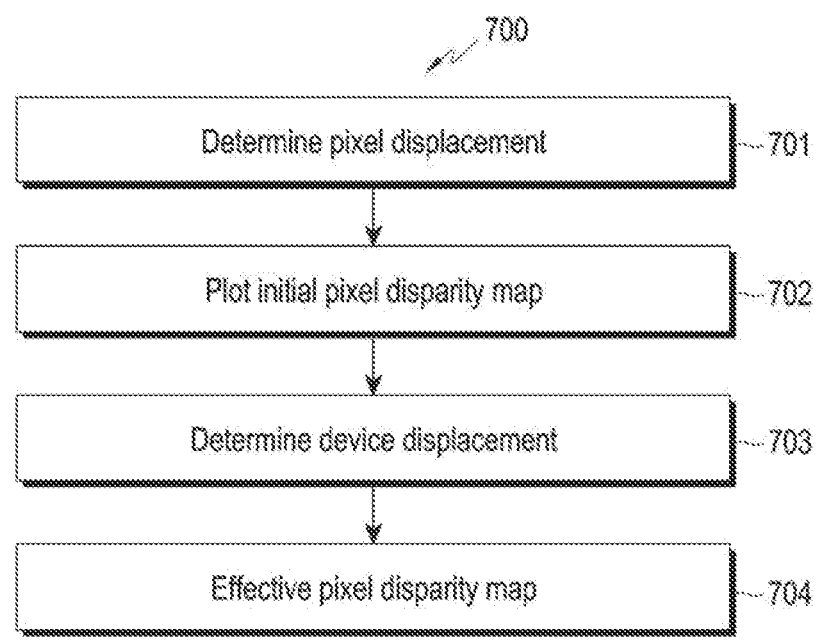
FIG. 7 is a flow diagram illustrating a method for determining an effective pixel disparity map, according to according to an embodiment.

FIG. 7 is a flow diagram (700) illustrating a method for determining the effective pixel disparity map by the electronic device (100) (e.g. the processor (130)), according to an embodiment. In an embodiment, the pixel disparity generator (112) performs steps 701-704 of the flow diagram (700). At step 701, the method includes determining an average pixel displacement in n image frames. Consider, a 3D point P. I' and I" are the projections of the point P in 2 images frames consisting of m pixels captured during the shake of the electronic device (100). d' and d" are the distances between point P and its projection I' and I" respectively. Then, $$\text{the pixel displacement} = \sum_{i=1}^{m} (d'' - d')^2.$$

Then, $$\text{the average pixel displacement of } n \text{ frames} = \left(\sum_{i=1}^{n}\sum_{i=1}^{m}(d''-d')^2\right)/n.$$

At step 702, the method includes plotting an initial pixel disparity map using the average pixel displacement. At step 703, the method includes determining the displacement of the electronic device (100) due to the shake. At step 703, the method includes determining the effective pixel disparity map by subtracting the displacement of the electronic device (100) from the initial pixel disparity map.

Figure 8A:
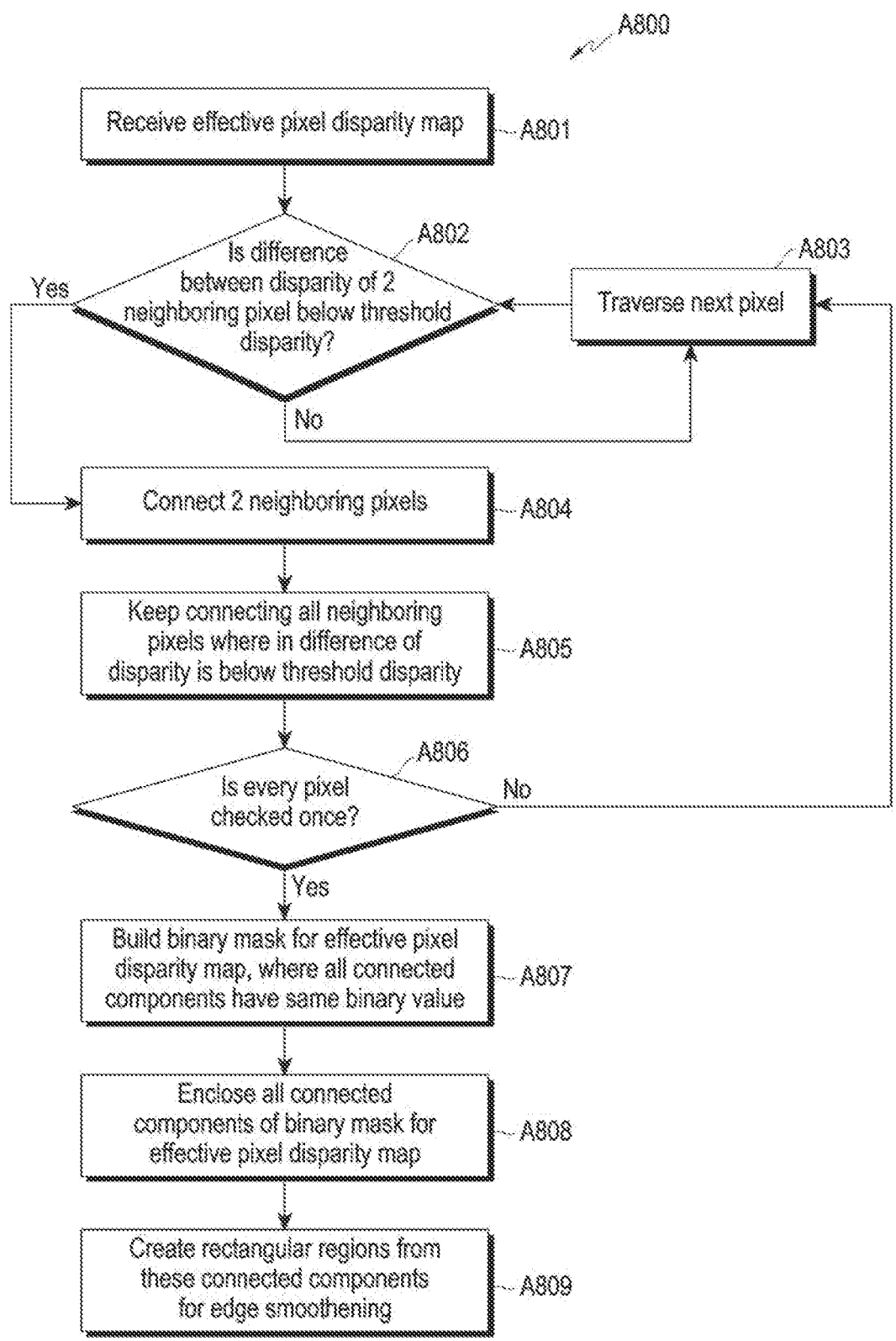
FIG. 8A is a flow diagram illustrating a method for creating rectangular regions on the effective pixel disparity map, according to according to an embodiment.

FIG. 8A is a flow diagram (A800) illustrating a method for creating the rectangular regions on the effective pixel disparity map by the electronic device (100) (e.g. the processor (130)), according to an embodiment. In an embodiment, the dynamic tiling controller (113) performs steps A801-A809 of the flow diagram (A800). At step A801, the method includes receiving the effective pixel disparity map from the pixel disparity generator (112). At step A802, the method includes determining whether the difference between a disparity of 2 neighboring pixels of the effective pixel disparity map is below a threshold disparity. In an embodiment, the difference between the disparity of 2 neighboring pixels may be determined based on the difference of the refraction coefficient between neighboring pixels of the effective pixel disparity map. Upon determining that the difference between the disparity of the 2 neighboring pixels of the effective pixel disparity map is not below the threshold disparity (Step A802, No), at step A803, the method includes traversing to the next 2 neighboring pixels to check the difference between the disparity of the next 2 neighboring pixels and further flows to the step A802.

On the other hand, upon determining that the difference between the disparity of the 2 neighboring pixels of the effective pixel disparity map is below the threshold disparity (Step A802, Yes), at step A804, the method includes connecting the 2 neighboring pixels to a set. At step A805, the method includes keep connecting all neighboring pixels, where the difference of disparity of all the neighboring pixels is below the threshold disparity. At step A806, the method includes determining whether all pixels in the effective pixel disparity map are checked once. If all the pixels in the effective pixel disparity map are not checked once (Step A806, No), then the method further flows to the step A803. On the other hand, if all the pixels in the effective pixel disparity map are checked once (Step A806, Yes), at step A807, the method includes building a binary mask for the effective pixel disparity map, where all connected components have a same binary value. At step A808, the method includes enclosing all connected components of the binary mask for the effective pixel disparity map. At step A809, the method includes creating the rectangular regions from these connected components for edge smoothening.

Figure 8B:
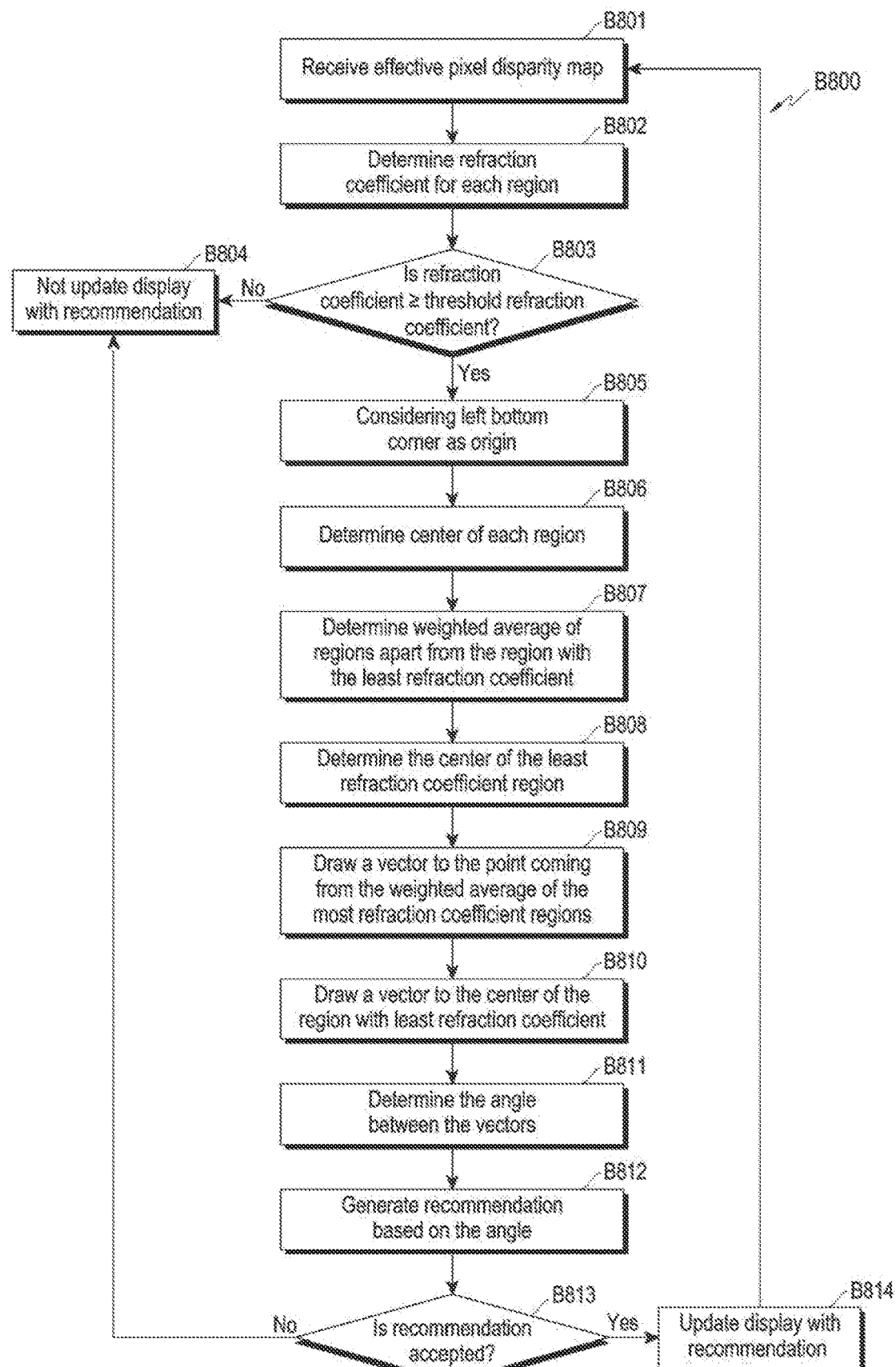
FIG. 8B is a flow diagram illustrating a method for providing a recommendation for the optical camera quality enhancement, according to according to an embodiment.

FIG. 8B is a flow diagram (B800) illustrating a method for providing the recommendation including the angle to tilt/rotate the electronic device (100) for the optical camera quality enhancement by the electronic device (100) (e.g. the processor (130)), according to an embodiment. In an embodiment, the recommendation engine (114) performs steps B801-B814 of the flow diagram (B800). At step B801, the method includes receiving the effective pixel disparity map from the pixel disparity generator (112). At step B802, the method includes determining the refraction coefficient for each region.

At step B803, the method includes determining whether the refraction coefficient for each region is greater than or equal to the threshold refraction coefficient (e.g. 1). Upon determining that the refraction coefficient for each region is not greater than or equal to the threshold refraction coefficient (Step B803, No), at step B804, the method includes not updating the display (150) with the recommendation. On the other hand, upon determining that the refraction coefficient for each region is greater than or equal to the threshold refraction coefficient (Step B803, Yes), at step B805, the method includes considering the left bottom corner of the effective pixel disparity map as the origin (i.e. p1=(0, 0)). At step B806, the method includes determining the center of each region with respect to the origin. At step B807, the method includes determining a weighted average of regions apart from the region with the least refraction coefficient. In an embodiment, the weighted average of regions apart from the region with the least refraction coefficient is determined using an equation given below.

$$(x_w, y_w) = (x_c, y_c) * r_n / (n-1)$$

where $x_c$, $y_c$ are coordinates of a center of the region, $r_n$ is refractive index of region n, and n is total number of regions.

At step B808, the method includes determining the center of the region with the least refraction coefficient. At step B809, the method includes drawing a vector to the point (i.e. p3=(x', y') coming from the weighted average of the regions with the most refraction coefficient. At step B810, the method includes drawing a vector to the center (i.e. p2=(x, y)) of the region with the least refraction coefficient. At step B811, the method includes determining the angle between the vectors. In an embodiment, the angle (θ) between the vectors is determined using an equation given below.

$$\theta = a\cos((a2+b2-c2)/2ab)$$

where a is the distance between p1 and p2, b is the distance between p1 and p3, and, c is the distance between p2 and p3.

At step B812, the method includes generating the recommendation on the display (150) indicating to the user to tilt/rotate the electronic device (100) to the angle. At step B813, the method includes determining whether the recommendation is accepted. For example, the method may include determining whether the user has accepted to receive the recommendation. If the recommendation has not been accepted (Step B813, No), then the method further flows to step B804. If the recommendation has been accepted (Step B813, Yes), at step B814, the method includes updating the display (150) with the recommendation Further, the method flows to the step B801 upon the electronic device (100) being tilted/rotated to the angle.

Figure 8C:
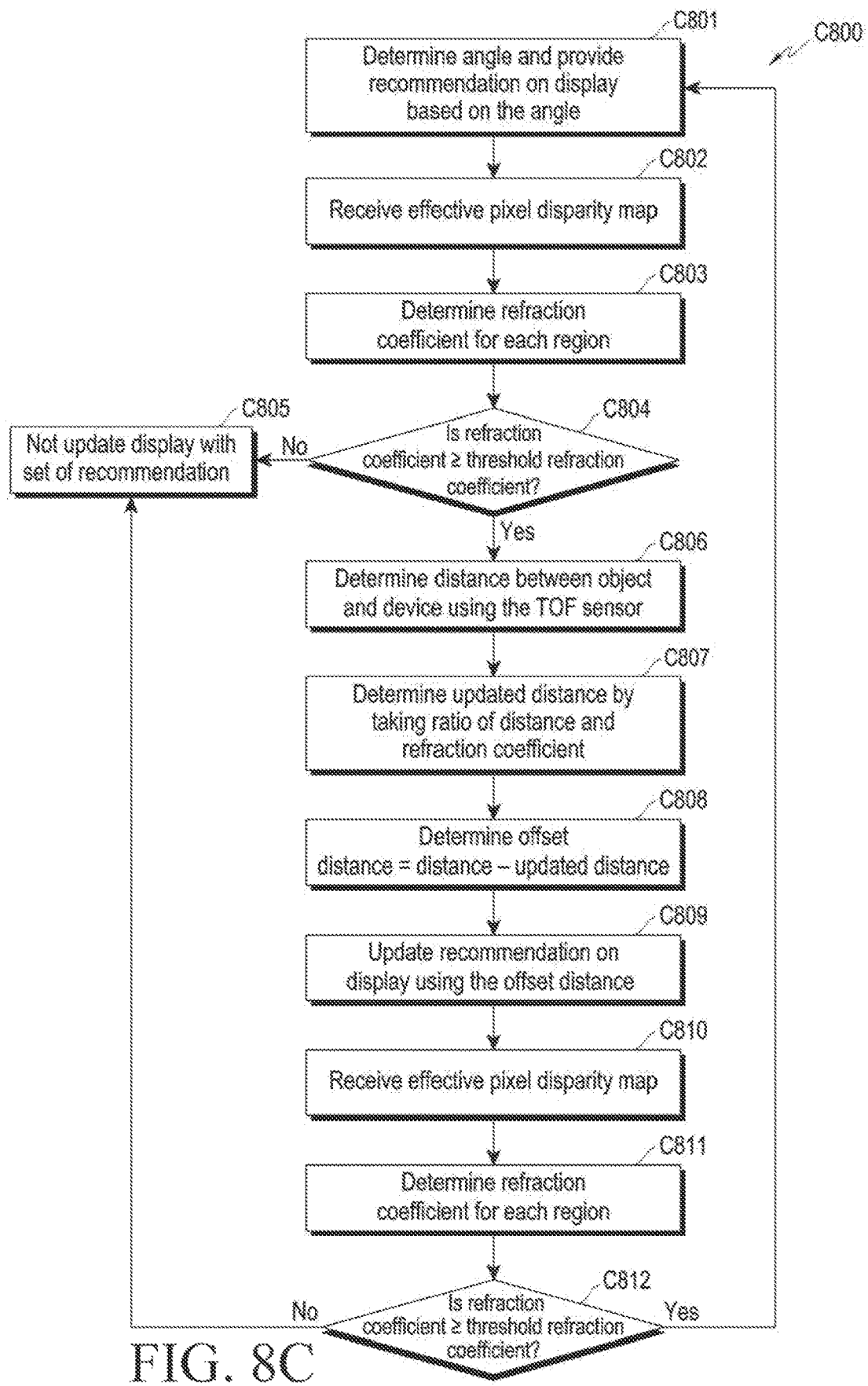
FIG. 8C is a flow diagram illustrating a method for providing a recommendation for the optical camera quality enhancement, according to according to an embodiment.

FIG. 8C is a flow diagram (C800) illustrating a method for providing the recommendation includes the offset distance to move the electronic device (100) towards/away from the object for the optical camera quality enhancement by the electronic device (100), according to an embodiment. In an embodiment, the recommendation engine (114) performs steps C801-C812 of the flow diagram (C800). At step C801, the method includes determining the angle and providing the recommendation on the display (150) based on the angle. At step C802, the method includes receiving the effective pixel disparity map from the pixel disparity generator (112), where the pixel disparity generator (112) generates the effective pixel disparity map upon tilting/rotating the electronic device (100) to the angle. At step C803, the method includes determining the refraction coefficient for each region of the effective pixel disparity map. At step C804, the method includes determining whether the refraction coefficient for each region is greater than the threshold refraction coefficient (e.g. 1).

Upon determining that the refraction coefficient for each region is not greater than or equal to the threshold refraction coefficient (Step C804, No), at step C805, the method includes not updating the display (150) with the recommendation On the other hand, upon determining that the refraction coefficient for each region is greater than or equal to the threshold refraction coefficient (Step C804, Yes), at step C806, the method includes determining the distance between the object and the device using the TOF sensor (160d). At step C807, the method includes determining the updated distance by taking the ratio of the distance and the refraction coefficient. At step C808, the method includes determining the offset distance by subtracting the updated distance from the distance. At step C809, the method includes updating the recommendation on the display (150) by indicating to move the electronic device (100) for the offset distance towards/away from the object.

At step C810, the method includes receiving the effective pixel disparity map from the pixel disparity generator (112), where the pixel disparity generator (112) generates the effective pixel disparity map upon moving the electronic device (100) for the offset distance towards/away from the object. At step C811, the method includes determining the refraction coefficient for each region of the effective pixel disparity map. At step C812, the method includes determining whether the refraction coefficient for each region is greater than or equal to the threshold refraction coefficient (e.g. 1). If the refraction coefficient for each region is greater than or equal to the threshold refraction coefficient (Step C812, Yes), then the method further flows to the step C801. If the refraction coefficient for each region is not greater than or equal to the threshold refraction coefficient (Step C812, No)), then the method further flows to the step C805.

The various actions, acts, blocks, steps, or the like in the flow diagrams (300, 400, 402a, 600, 700, A800, B800, C800) may be performed in the order presented, in a different order, or simultaneously. Further, In an embodiment, some of the actions, acts, blocks, steps, or the like may be omitted, added, modified, skipped, or the like without departing from the scope of the invention.

Figure 9C:
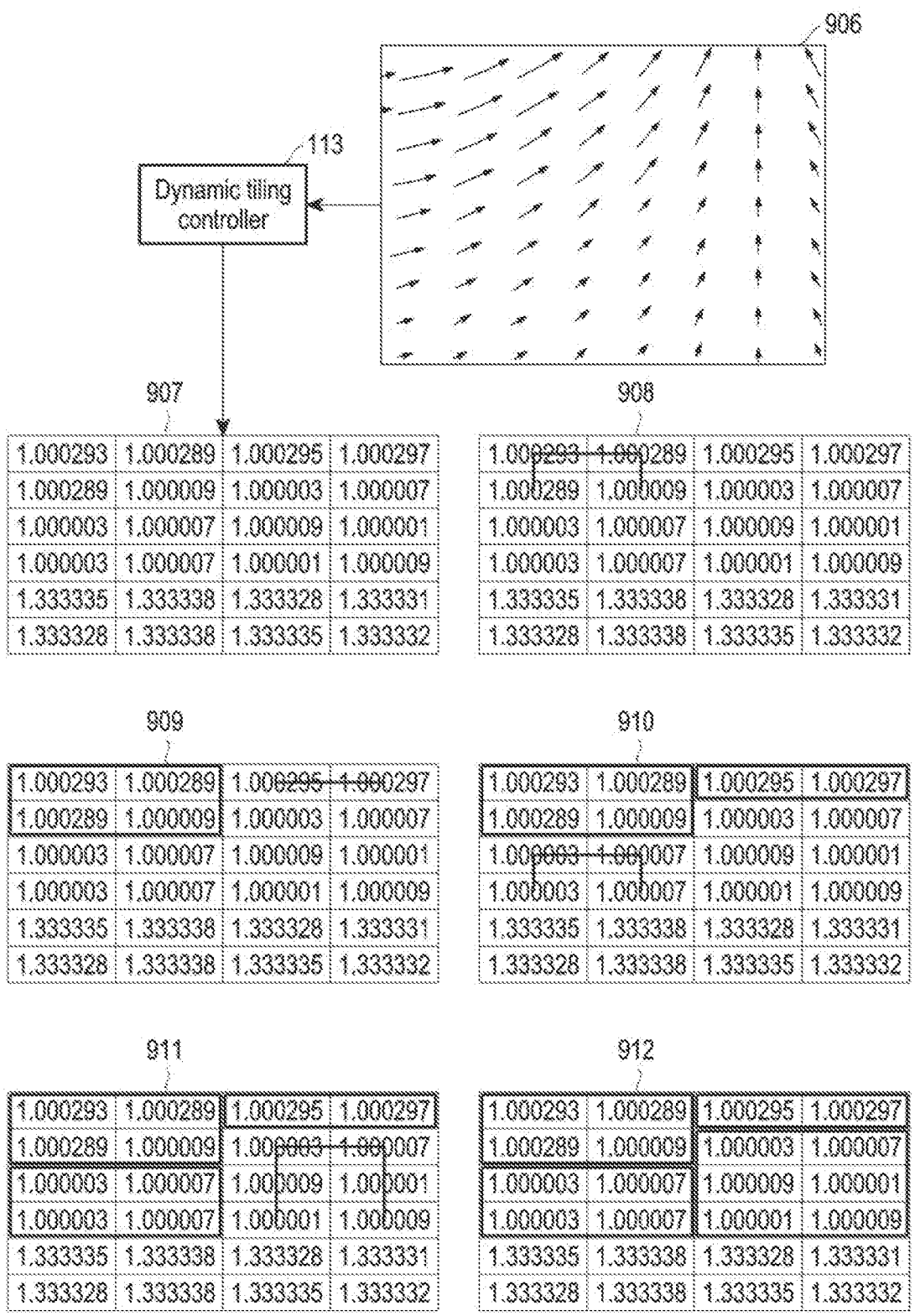
Figure 9E:
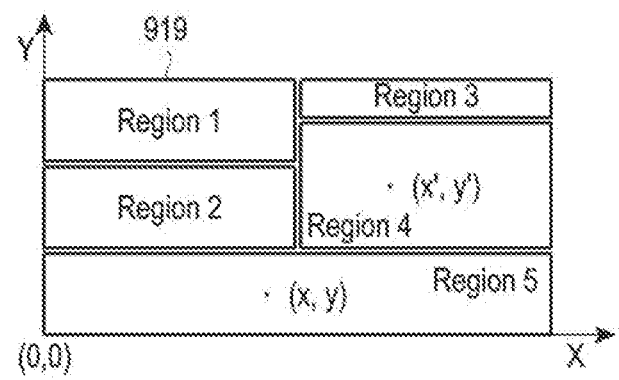
Figure 9E:
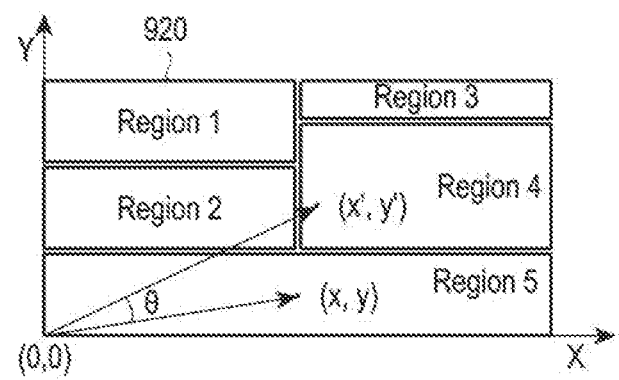
Figure 9E:
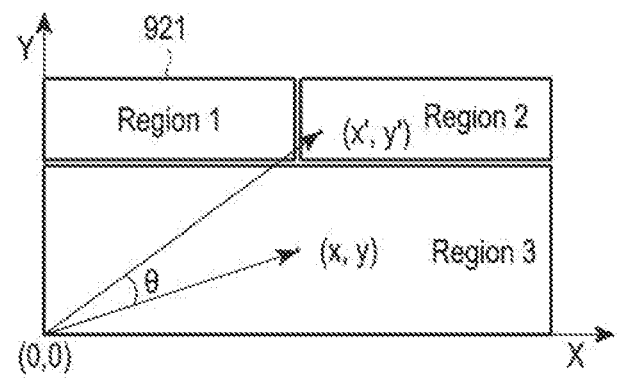
Figure 9E:
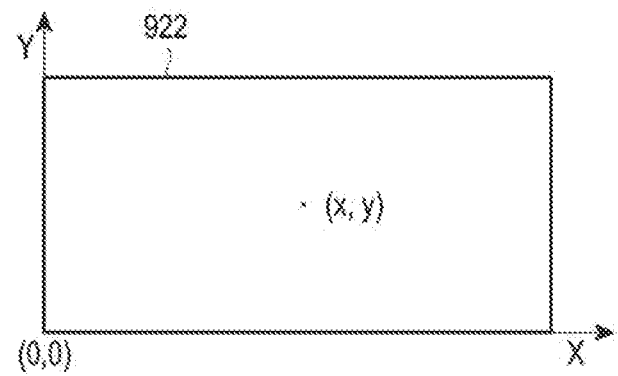

FIGS. 9A-9E are schematic diagrams illustrating an example scenario of enhancing the optical camera quality by the electronic device (100), according to an embodiment. As shown in FIG. 9e, the pixel disparity generator (112) obtains the image frames (901, 902) of the scene including the object captured at two different geographical locations of the electronic device (100), upon getting the trigger from the activator (111). In an example, the image frames (901, 902)

are captured while shaking the electronic device (100)). Further, the pixel disparity generator (112) generates the initial pixel disparity map (903) using the image frames (901, 902). As shown in FIG. 9B, the pixel disparity generator (112) obtains values ax, ay (904) from the accelerometer (160b) while capturing the image frames (901, 902). The pixel disparity generator (112) obtains values gx, gy (905) from the gyroscope (160c) while capturing the image frames (901, 902). The pixel disparity generator (112) normalizes the values ax, ay (904) with the values gx, gy (905). Further, the pixel disparity generator (112) determines the displacement of the electronic device (100) for capturing the image frames (901, 902) using the equation given below.

Displacement of the electronic device $= \sqrt{(\Delta_x)^2 + (\Delta_y)^2}$ where, $\Delta x = \int_0^t \left[ \int_0^{t'} a_x(t'') dt'' \right] dt'$ $\Delta y = \int_0^t \left[ \int_0^{t'} a_y(t'') dt'' \right] dt'$ Further, the pixel disparity generator (112) generates the effective pixel disparity map (906) by subtracting the displacement of the electronic device (100) from the initial pixel disparity map (903).

As shown in FIGS. 9C and 9D, the dynamic tiling controller (113) receives the effective pixel disparity map (906) from the pixel disparity generator (112). As shown in 907, the effective pixel disparity map (906) includes the refraction coefficient associated with each pixel of the image frame. As shown in 908-914, the dynamic tiling controller (113) connects the neighboring pixels and generates multiple sets of the pixels, where in each set of pixels, the disparity of the refraction coefficient of neighboring pixels is less than the threshold disparity. As shown in 915, the dynamic tiling controller (113) determines binary masked values (1-5) for each set of pixels, where the connected components in each set have same binary value. As shown in 916, the dynamic tiling controller (113) encloses every connected component and creates the rectangular regions (e.g. region 1-region 5) from the connected components. As shown in 917, the dynamic tiling controller (113) takes the left bottom corner of the plurality pixel disparity map as the origin. As shown in 918, the dynamic tiling controller (113) generates the hash map of each region and stores the hash map to the memory (120). An example for the hash map of each region is given in table 1 given below.

TABLE 1

| Region | Hash map |
|---|---|
| 1 | {0, 4, 4, 6, 1.1} |
| 2 | {4, 5, 8, 6, 1.17} |
| 3 | {0, 2, 4, 4, 1.24} |
| 4 | {4, 2, 5, 8, 1.33} |
| 5 | {0, 0, 8, 2, 1.03} |

In the example, that the hash map of region 1 is {0, 4, 4, 6, 1.1} indicates that (0, 4) are the coordinates of the left bottom corner of the region 1, (4, 6) are the coordinates of the right top corner of the region 1, and 1.1 is an average of refraction coefficient associated with the region 1.

As shown in 919 of the FIG. 9E, the recommendation engine (114) determines the coordinates of center of the region 5 and the region 4 with reference to the left bottom corner of the pixel disparity map as the origin. In an example, for determining the coordinates of the center of the region 5, the recommendation engine (114) fetches the hash map of the region 5 and calculates the coordinates of center of the region 5 using the coordinates of the left bottom corner and the right top corner of the region 5 in the hash map. Similarly, the recommendation engine (114) may determine the coordinates of the center of other regions. The coordinates of the center of the region 5 are (x, y). The coordinates of the center of the region 4 are (x', y'). As shown in 920, the recommendation engine (114) modifies the coordinates of the centers of the region 5 based on the refraction coefficient associated with the region 5, and the coordinates of the center of the region 4 based on the refraction coefficient associated with the region 4. Further, the recommendation engine (114) determines the vectors using the modified center coordinates of the region 5 and the region 4 with reference to the origin. Further, the recommendation engine (114) estimates the angle between the vectors as the angle of rotation of the electronic device (100) for minimizing the distortion in the image frame.

In a next iteration, upon the tilting/rotating the electronic device (100) to the angle, the pixel disparity generator (112) generates the effective pixel disparity map, and the recommendation engine (114) determines new regions on the effective pixel disparity map as shown in 921. Further, the recommendation engine (114) repeats the steps to estimate the angle between the vectors from the modified centers of 2 new regions (i.e., region 3 and region 2) in 921. Thus, in a final iteration, only one region will remain on the effective pixel disparity map as shown in 922, and in this final iteration the distortion in the image frame will be negligible or zero.

FIG. 10A is a schematic diagram illustrating an example scenario of determining the distance between the object and the electronic device (100) by the electronic device (100), according to an embodiment. The ToF sensor (160d) transmits a signal (1001) towards the object (1002), where the ToF sensor (160d) is embedded on the electronic device (100). A signal (1003) reflects from the object (1002) to the ToF sensor (160d) due to hitting on the object (1002) by the signal (1001). The electronic device (100) samples the reflected signal (1003) four times at equal intervals for every period (i.e. ¼ period). From the four samples (ϕ0, ϕ1, ϕ3, ϕ4), the electronic device (100) determines phase ϕ, an offset B and an amplitude A using the equation given below.

$$\varphi = \arctan\left(\frac{\varphi_0 - \varphi_2}{\varphi_1 - \varphi_3}\right)$$

$$B = \frac{\varphi_0 + \varphi_1 + \varphi_2 + \varphi_3}{4}$$

$$A = \frac{\sqrt{(\varphi_0 - \varphi_2)^2 + (\varphi_1 - \varphi_3)^2}}{2}$$

A phase difference (Δφ) between the transmitted signal (1001) and the reflected signal (1003) varies based on the distance of the object (1002) and the ToF sensor (160d). The electronic device (100) determines the phase difference, and further determines the distance (D) of the object (1002) and the electronic device (100) based on the phase difference using an equation given below.

$$D = \frac{1}{2}\left(\frac{c\Delta_\varphi}{2\pi f}\right)$$

where c is light speed and f is modulation frequency of the signal (1001).

Figure 10B:
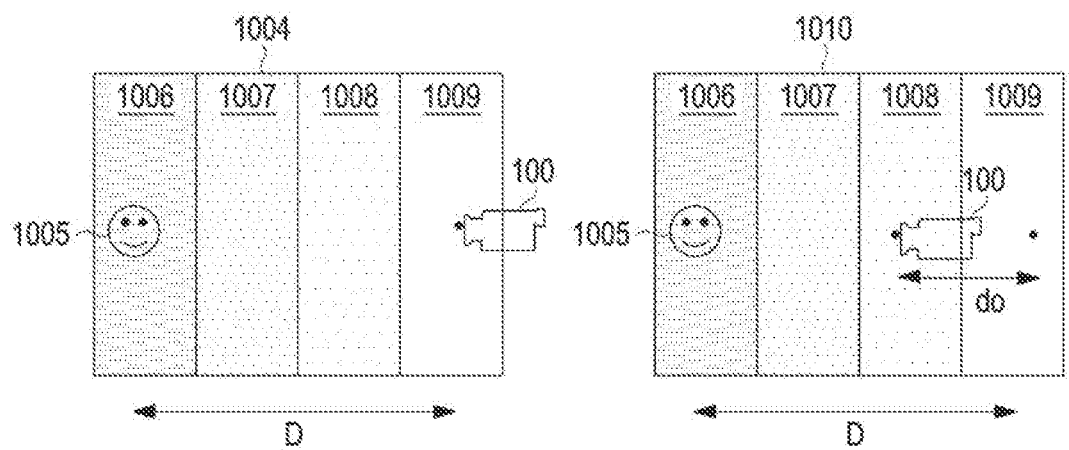
FIG. 10B is a schematic diagram illustrating an example scenario of determining an offset distance, according to according to an embodiment.

FIG. 10B is a schematic diagram illustrating an example scenario of determining the offset distance by the electronic device (100), according to an embodiment. The electronic device (100) recommends the offset distance when the image frame cannot be improved further by rotating the electronic device (100) to the angle. The offset distance (do) is calculated using the equation given below, where the offset distance is directly proportional to the refraction coefficient achieved after adjusting the position of the electronic device (100).

$$do = D - (D/\text{refraction coefficient})$$

As the distance from the object increases from the electronic device (100), then layers of the medium which may cause further refraction of light rays also increases, which causes increased distortion in the image frame. As shown in 1004, the object (1005) and the electronic device (100) are in different regions, with the medium in between having different layers (1006-1009) of varying refractive index. As shown in 1010, after moving closer to the object for the offset distance by the electronic device (100), the layers (1006-1008) in between the object (1005) and the electronic device (100) are reduced which ultimately reduces the distortion in the image frame.

Figure 11:
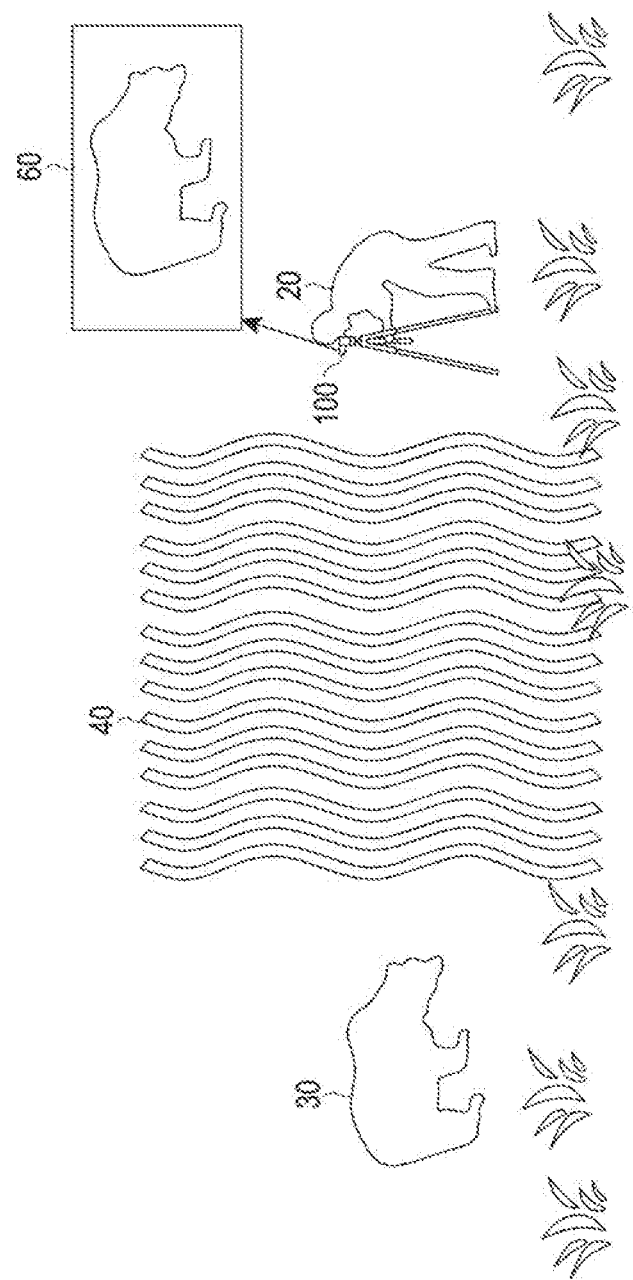
FIG. 11 illustrates an example scenario of capturing an image of an object by the electronic device, according to according to an embodiment.

FIG. 11 illustrates an example scenario of capturing the image of the object by the electronic device (100), according to an embodiment. Consider, a user (20) is capturing an image frame of an animal (30) using the electronic device (100). Air (40) between the animal (30) and the camera (10) is hot compared to air around the animal (30) and the camera (10). Due to the difference in temperature, the density of the air (40) and the air around the animal (30) and the electronic device (100) will also be different, which further results in the atmospheric refraction between the animal (30) and the electronic device (100). The distortions may present while capturing the image frame of the animal (30) using the electronic device (100) under the influence of the atmospheric refraction. For minimizing the distortion in the image frame, the electronic device (100) recommends the angle to rotate the electronic device (100) to the user (20). Upon rotating the electronic device (100) to the angle, and capturing the image frame of the animal (30), the distortion will be negligible or zero in the captured image frame (60).

Figure 12:
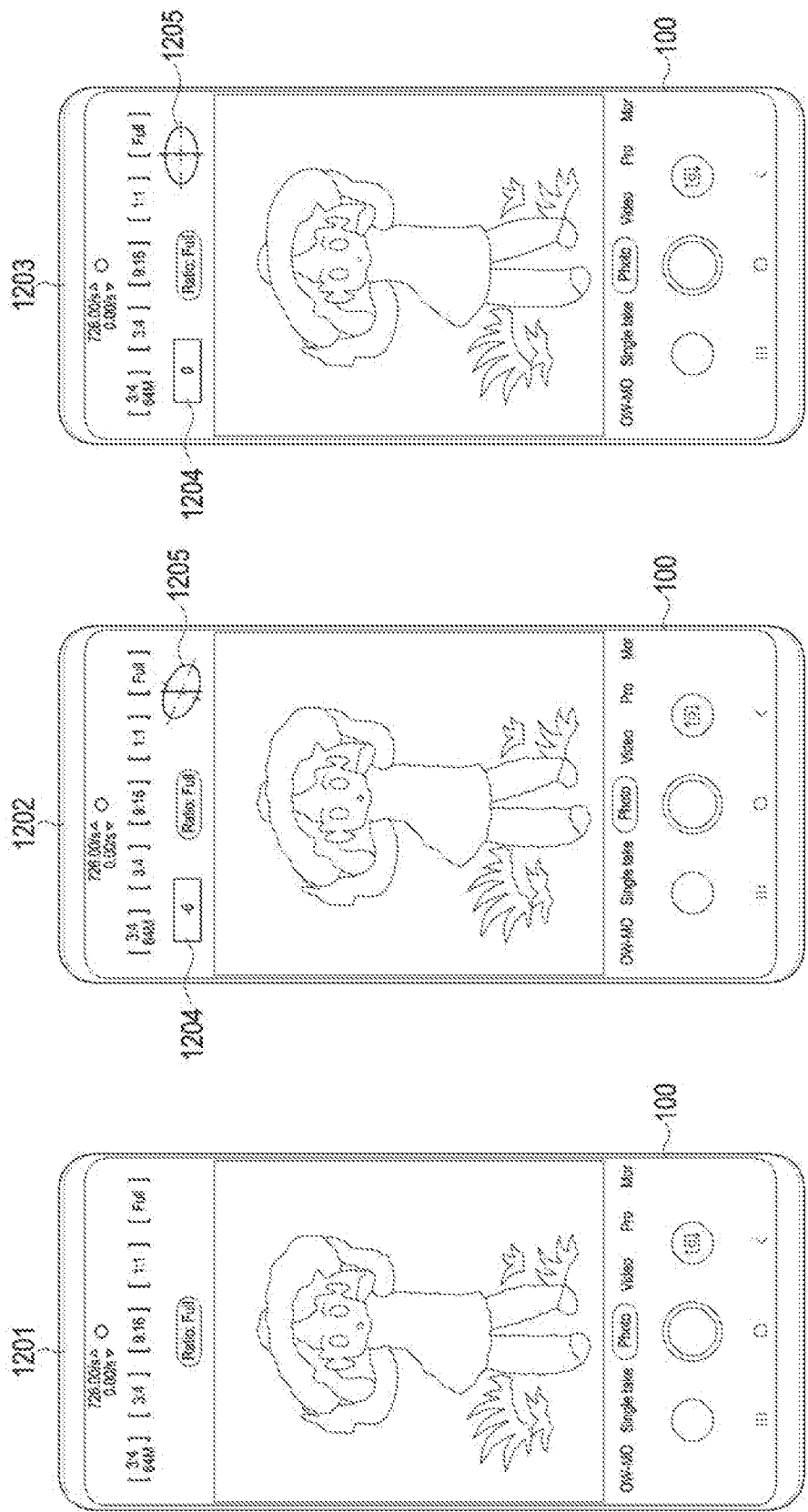
FIG. 12 illustrates an example scenario of providing a recommendation, according to according to an embodiment.

FIG. 12 illustrates an example scenario of providing the recommendation by the electronic device (100), according to an embodiment. At 1201, consider the user is trying to capture the image frame of the scene that includes the object (e.g., a girl wearing a hat) using the electronic device (100), where the atmospheric refraction is present in between the electronic device (100) and the object. Due to the atmospheric refraction, the electronic device (100) detects the distortion in the image frame of the scene. At 1202, the electronic device (100) displays the indication to the user to minimize the distortion in the image frame. The indication includes the offset distance (1204) to move towards the object, and the angle (1205) to rotate the electronic device (100). The electronic device (100) monitors the change in the orientation of the electronic device (100) made by the user based on the indication. As 1203, upon adjusting the orientation of the electronic device (100) to the optimal orientation, the distortion in the image frame will be negligible or zero.

Table given below contains an example of the recommendation given by the electronic device (100) based on the hash map of regions.

TABLE 2

| Hash map | Recommendation | |
|---|---|---|
| | Angle | Offset distance |
| {0, 0, 4, 4, 1.04}, {4, 4, 6, 6, 1.01}, {6, 6, 9, 9, 1.03} | Rotate device by 20° in clockwise direction | Move closer to object by 10 meters |
| {0, 0, 3, 3, 1.22}, {3, 3, 6, 6, 1.03}, {6, 6, 9, 9, 1.10} | Rotate device by 15° in anti-clockwise direction | Move closer to object by 6 meters |
| {0, 0, 5, 5, 1.32}, {5, 5, 6, 6, 1.01}, {6, 6, 12, 12, 1.27} | Rotate device by 14° in anti-clockwise direction | Move closer to object by 3 meters |
| {0, 0, 4, 4, 1.15}, {4, 4, 5, 5, 1}, {5, 5, 10, 10, 1.03} | Rotate device by 64° in anti-clockwise direction | Move closer to object by 20 meters |
| {0, 0, 4, 4, 1.08}, {4, 4, 6, 6, 1}, {6, 6, 9, 9, 1.07} | Rotate device by 39° in clockwise direction | Move closer to object by 19 meters |

The embodiments disclosed herein may be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments herein may be practiced with modification within the scope of the embodiments as described herein.

What is claimed is:

1. A method comprising:
    receiving, by an electronic device, an image frame of a scene including at least one object from a preview field of a camera of the electronic device;
    determining, by the electronic device, at least one region of the image frame affected by distortion;
    generating, by the electronic device, a pixel disparity map comprising a refraction coefficient associated with each pixel of the image frame based on the at least one region affected by the distortion;
    determining, by the electronic device, a plurality of regions on the pixel disparity map, each of the plurality of regions including pixels that have a similar pixel disparity;
    estimating, by the electronic device, an optimal orientation of the electronic device to minimize the distortion in the image frame based on the plurality of regions on the pixel disparity map; and
    displaying, by the electronic device, an indication indicating the optimal orientation of the electronic device.

2. The method as claimed in claim 1, further comprising:
    detecting, by the electronic device, a change in a current orientation of the electronic device, the change in the current orientation of the electronic device being dynamically displayed on a display of the electronic device;
    determining, by the electronic device, whether the change in the current orientation of the electronic device matches the optimal orientation of the electronic device; and enabling, by the electronic device, the camera to capture at least one image frame of the scene when the change in the current orientation matches the optimal orientation.

3. The method as claimed in claim 1, wherein determining the at least one region of the image frame affected by the distortion comprises:

determining, by the electronic device, the distortion caused by spatial-temporal refraction in the image frame based on at least one of a linear asymmetry in the image frame, a distance between the at least one object and the electronic device, a temperature of a medium between the at least one object and the electronic device, a type of the medium, or a color of the medium.

4. The method as claimed in claim 3, wherein determining the distortion in the image frame based on the linear asymmetry of the image frame comprises:

converting, by the electronic device, the image frame from a Red Green Blue (RGB) to a greyscale image frame;

initializing, by the electronic device, an array of the image frame with complete zero values;

selecting, by the electronic device, two 3*3 kernels from the array of the image frame for performing horizontal and vertical convolutions;

determining, by the electronic device, a gradient approximation value by convolving the two 3*3 kernels with the greyscale image frame;

comparing, by the electronic device, the gradient approximation value with a threshold gradient angle for identifying the linear asymmetry in the image frame; and detecting, by the electronic device, the distortion in the image frame based on a result of the comparing.

5. The method as claimed in claim 1, wherein generating the pixel disparity map comprises:

receiving, by the electronic device, an alternate image frame of the scene including the at least one object from the camera of the electronic device positioned at an alternate geographical location;

determining, by the electronic device, a displacement of each pixel in the alternate image frame with reference to a position of a corresponding pixel in the image frame based on the at least one region affected by the distortion;

determining, by the electronic device, a displacement of the electronic device for capturing the alternate image frame based on values received from orientation sensors of the electronic device;

determining, by the electronic device from the displacement of each pixel in the alternate image frame, an effective displacement of each pixel in the alternate image frame by reducing the displacement of the electronic device;

estimating, by the electronic device, the refraction coefficient associated with each pixel of the image frame based on the effective displacement of each pixel in the alternate image frame; and generating, by the electronic device, the pixel disparity map using the effective displacement of each pixel and the refraction coefficient associated with each pixel of the image frame.

6. The method as claimed in claim 1, wherein determining the plurality of regions comprises:

determining, by the electronic device, a difference of the refraction coefficient between neighboring pixels of the image frame;

identifying, by the electronic device, multiple sets of neighboring pixels, where, for each set of the multiple sets, the difference of the refraction coefficient between neighboring pixels in the set is less than a threshold refraction coefficient; and generating, by the electronic device, the plurality of regions on the pixel disparity map based on the multiple sets of neighboring pixels.

7. The method as claimed in claim 1, wherein estimating the optimal orientation of the electronic device comprises:

estimating, by the electronic device, a change in a current orientation of the electronic device, the change comprising at least one of an angle of rotation of the electronic device or a linear movement of the electronic device towards or away from the at least one object, for minimizing the distortion in the image frame based on the plurality of regions on the pixel disparity map.

8. The method as claimed in claim 7, wherein the change comprises the angle of rotation, and wherein estimating the angle of rotation comprises:

determining, by the electronic device, coordinates of centers of a first region and a second region of the plurality of regions with reference to a left bottom corner of the pixel disparity map as an origin;

modifying, by the electronic device, the coordinates of a center of the first region based on the refraction coefficient associated with the first region, and modifying the coordinates of a center of the second region based on the refraction coefficient associated with the second region;

determining, by the electronic device, vectors using the modified center coordinates of the first region and the second region with reference to the origin; and estimating, by the electronic device, an angle between the vectors as the angle of rotation of the electronic device.

9. The method as claimed in claim 7, wherein the change comprises the linear movement, and wherein estimating the linear movement comprises:

determining, by the electronic device, a distance between the at least one object and the electronic device using a Time-of-Flight (ToF) sensor of the electronic device;

estimating, by the electronic device, an updated distance by determining a ratio of the distance and a refraction coefficient of a medium between the at least one object and the electronic device; and determining, by the electronic device, the linear movement based on a difference between the distance and the updated distance.

10. The method as claimed in claim 1, wherein the indication includes an offset distance to move toward to the at least one object and an angle to rotate the electronic device.

11. An electronic device comprising:
a display;
a camera; and
at least one processor configured to:
receive an image frame of a scene including at least one object from a preview field of the camera,
determine at least one region of the image frame affected by distortion,
generate a pixel disparity map comprising a refraction coefficient associated with each pixel of the image frame based on the at least one region affected by the distortion,
determine a plurality of regions on the pixel disparity map, each of the plurality of regions including pixels that have a similar pixel disparity, estimate an optimal orientation of the electronic device to minimize the distortion in the image frame based on the plurality of regions on the pixel disparity map, and display an indication indicating the optimal orientation of the electronic device through the display.

12. The electronic device as claimed in claim 11, wherein the least one processor is further configured to:

detect a change in a current orientation of the electronic device, the change in the current orientation of the electronic device being dynamically displayed on the display;

determine whether the change in the current orientation of the electronic device matches the optimal orientation of the electronic device; and capture, through the camera, at least one image frame of the scene when the change in the current orientation matches the optimal orientation.

13. The electronic device as claimed in claim 11, wherein the least one processor is configured to:

determine the distortion caused by spatial-temporal refraction in the image frame based on at least one of a linear asymmetry in the image frame, a distance between the at least one object and the electronic device, a temperature of a medium between the at least one object and the electronic device, a type of the medium, or a color of the medium.

14. The electronic device as claimed in claim 13, wherein the least one processor is configured to:

convert the image frame from Red Green Blue (RGB) to a greyscale image frame;

initialize an array of the image frame with complete zero values;

select two 3*3 kernels from the array of the image frame for performing horizontal and vertical convolutions;

determine a gradient approximation value by convolving the two 3*3 kernels with the greyscale image frame;

compare the gradient approximation value with a threshold gradient angle for identifying the linear asymmetry in the image frame; and detect the distortion in the image frame based on a result of the comparing.

15. The electronic device as claimed in claim 11, wherein the least one processor is configured to:

receive an alternate image frame of the scene including the at least one object from the camera of the electronic device positioned at an alternate geographical location;

determine a displacement of each pixel in the alternate image frame with reference to a position of a corresponding pixel in the image frame based on the at least one region affected by the distortion;

determine a displacement of the electronic device for capturing the alternate image frame based on values received from orientation sensors of the electronic device;

determine, from the displacement of each pixel in the alternate image frame, an effective displacement of each pixel in the alternate image frame by reducing the displacement of the electronic device;

estimate the refraction coefficient associated with each pixel of the image frame based on the effective displacement of each pixel in the alternate image frame; and generate the pixel disparity map using the effective displacement of each pixel and the refraction coefficient associated with each pixel of the image frame.

16. The electronic device as claimed in claim 11, wherein the least one processor is configured to:

determine a difference of the refraction coefficient between neighboring pixels of the image frame;

identify multiple sets of neighboring pixels, where, for each set of the multiple sets, the difference of the refraction coefficient between neighboring pixels in the set is less than a threshold refraction coefficient; and generate the plurality of regions on the pixel disparity map based on the multiple sets of neighboring pixels.

17. The electronic device as claimed in claim 11, wherein the least one processor is configured to:

estimate a change in a current orientation of the electronic device, the change comprising at least one of an angle of rotation of the electronic device or a linear movement of the electronic device towards or away from the at least one object.

18. The electronic device as claimed in claim 17, wherein the change comprises the angle of rotation, and wherein the least one processor is configured to:

determine coordinates of centers of a first region and a second region of the plurality of regions with reference to a left bottom corner of the pixel disparity map as an origin;

modify the coordinates of a center of the first region based on the refraction coefficient associated with the first region, and modifying the coordinates of a center of the second region based on the refraction coefficient associated with the second region;

determine vectors using the modified center coordinates of the first region and the second region with reference to the origin; and estimate an angle between the vectors as the angle of rotation of the electronic device.

19. The electronic device as claimed in claim 17, wherein the change comprises the linear movement, and wherein the least one processor is configured to:

determine a distance between the at least one object and the electronic device using a Time-of-Flight (ToF) sensor of the electronic device;

estimate an updated distance by determining a ratio of the distance and a refraction coefficient of a medium between the at least one object and the electronic device; and determine the linear movement based on a difference between the distance and the updated distance.

20. The electronic device as claimed in claim 11, wherein the indication includes an offset distance to move toward to the at least one object and an angle to rotate the electronic device.

* * * * *